US010710671B2

(12) United States Patent
Henry et al.

(10) Patent No.: US 10,710,671 B2
(45) Date of Patent: Jul. 14, 2020

(54) HANDLEBAR CONTROLS

(71) Applicant: Earth Punched, LLC, Sammamish, WA (US)

(72) Inventors: Ronald Dean Henry, Seattle, WA (US); John Desautels, Sammamish, WA (US)

(73) Assignee: EARTH PUNCHED, LLC, Mill Creek, WA (US)

( * ) Notice: Subject to any disclaimer, the term of this patent is extended or adjusted under 35 U.S.C. 154(b) by 345 days.

(21) Appl. No.: 15/867,200

(22) Filed: Jan. 10, 2018

(65) Prior Publication Data

US 2018/0201338 A1 Jul. 19, 2018

Related U.S. Application Data

(60) Provisional application No. 62/446,234, filed on Jan. 13, 2017, provisional application No. 62/607,854, filed on Dec. 19, 2017.

(51) Int. Cl.
| | | |
|---|---|---|
| *B62K 23/04* | (2006.01) | |
| *B62M 25/08* | (2006.01) | |
| *B62J 6/04* | (2020.01) | |
| *B62L 3/02* | (2006.01) | |
| *B62J 6/05* | (2020.01) | |

(52) U.S. Cl.
CPC .............. *B62K 23/04* (2013.01); *B62J 6/04* (2013.01); *B62J 6/05* (2020.02); *B62L 3/02* (2013.01); *B62L 3/026* (2013.01); *B62M 25/08* (2013.01)

(58) Field of Classification Search
CPC ........ B62K 23/06; B62K 23/04; B62K 23/02; B62K 21/12; B62K 21/16; B62K 21/26; B62K 11/14; B62L 3/02; B62L 3/026; B62M 25/04; B60T 7/10; B60T 7/08; B60K 26/02; G05G 1/06
See application file for complete search history.

(56) References Cited

U.S. PATENT DOCUMENTS

| | | | | |
|---|---|---|---|---|
| 630,649 | A | * 8/1899 | Briggs ................... | B62K 21/26 74/551.9 |
| 3,948,361 | A | * 4/1976 | Carlson .................... | B62L 3/06 188/24.18 |
| 4,186,291 | A | * 1/1980 | Swanson ................ | B62K 23/06 200/505 |
| 4,213,513 | A | * 7/1980 | Beck ...................... | B60K 28/00 123/198 DC |

(Continued)

OTHER PUBLICATIONS

International Search Report and Written Opinion, dated Mar. 8, 2018, received in International Application No. PCT/US2018/013555.

*Primary Examiner* — Richard W Ridley
*Assistant Examiner* — Brian J McGovern
(74) *Attorney, Agent, or Firm* — Davis Wright Tremaine LLP; George C. Rondeau, Jr.; Heather M. Colburn

(57) ABSTRACT

A handlebar control for use with a vehicle operated by a user. The vehicle includes a handlebar operable to steer the vehicle and at least one brake configured to slow the vehicle when the at least one brake is activated. The handlebar control includes an actuator assembly mounted on the handlebar and configured to be actuated manually by a hand of the user. When actuated, the actuator assembly being configured to activate the at least one brake and/or another component of the vehicle.

24 Claims, 13 Drawing Sheets

(56) References Cited

U.S. PATENT DOCUMENTS

| | | | | |
|---|---|---|---|---|
| 4,899,610 | A | * | 2/1990 | Bourret .................. B62K 11/14 |
| | | | | 188/196 BA |
| 4,915,054 | A | * | 4/1990 | Vidovic .................... B62J 6/00 |
| | | | | 116/137 R |
| 4,941,369 | A | * | 7/1990 | Specht ....................... B62J 3/00 |
| | | | | 74/551.8 |
| 5,829,312 | A | * | 11/1998 | Berg ...................... B62K 23/06 |
| | | | | 74/502.2 |
| 5,868,377 | A | * | 2/1999 | Taomo .................. A01D 34/90 |
| | | | | 123/398 |
| 6,073,730 | A | | 6/2000 | Abe |
| 6,273,523 | B1 | | 8/2001 | Wakabayashi et al. |
| 6,690,266 | B1 | | 2/2004 | Jack et al. |
| 7,377,367 | B2 | | 5/2008 | Takizawa et al. |
| 7,487,694 | B2 | * | 2/2009 | Fukui ..................... B62K 21/12 |
| | | | | 74/484 R |
| 7,918,145 | B1 | | 4/2011 | Calendrille, Jr. |
| 8,151,666 | B1 | | 4/2012 | Kraus |
| 9,268,354 | B1 | * | 2/2016 | Vorhies .................... G05G 1/04 |
| 2010/0163332 | A1 | * | 7/2010 | Nagao ................... B62K 23/06 |
| | | | | 180/335 |
| 2011/0167952 | A1 | | 7/2011 | Tajima et al. |
| 2016/0264214 | A1 | * | 9/2016 | Rasmussen ............ B62M 25/04 |
| 2017/0166280 | A1 | * | 6/2017 | Yang ...................... B62K 23/06 |

* cited by examiner

HANDLEBAR CONTROLS

CROSS REFERENCE TO RELATED APPLICATIONS

This application claims the benefit of U.S. Provisional Patent Application No. 62/446,234, filed on Jan. 13, 2017, and U.S. Provisional Patent Application No. 62/607,854, filed on Dec. 19, 2017, which are incorporated herein by reference in their entireties.

BACKGROUND OF THE INVENTION

Field of the Invention

The present invention is directed generally to handlebar controls for vehicles, such as bicycles, motorcycles, mopeds, and the like, that are steered by handlebars.

Description of the Related Art

Previously, handlebar controls for vehicles (e.g., bicycles) have been implemented using mechanical devices, such as levers and dials. Unfortunately, these prior art handlebar controls have drawbacks and limited functionality. Therefore, a need exists for new handlebar control designs. The present application provides these and other advantages as will be apparent from the following detailed description and accompanying figures.

SUMMARY

An exemplary embodiment is a handlebar control for use with a vehicle operated by a user. The vehicle includes a handlebar operable to steer the vehicle and at least one brake configured to slow the vehicle when the at least one brake is activated. The handlebar control includes a housing, an actuator lever, and a brake actuator. The housing is configured to be mounted on the handlebar with a housed portion of the handlebar being positioned inside the housing. The actuator lever includes a distal portion pivotably mounted to the housing and wrapping partway around the housed portion of the handlebar. The actuator lever is pivotable between actuation and non-actuation positions with respect to the housing. When actuated, the brake actuator is configured to activate the at least one brake and/or another component of the vehicle (e.g., a clutch or a brake light switch). The brake actuator is not actuated when the actuation lever is in the non-actuation position. The brake actuator is positioned to be actuated by the actuator lever when the actuation lever is pivoted manually by the user into the actuation position.

Optionally, the handlebar control includes a palm rest mounted on the housing. The palm rest is configured to allow the user to rest a palm against the palm rest while the user operates the vehicle. Optionally, the palm rest is rotatable with respect to the housing to position the palm rest such the user may pivot the actuator lever while the user's palm is resting on the palm rest.

Optionally, the handlebar control may include a brake light switch configured to turn on a brake light of the vehicle when the brake actuator is being actuated and to turn off the brake light when the brake actuator is not being actuated.

Optionally, the brake actuator includes a switch and the brake actuator is actuated when the switch is turned on and the brake actuator not is actuated when the switch is turned off. Optionally, the actuator lever includes a cutout portion with an inner edge, the switch is at least partially positioned within the cutout portion, the inner edge is positioned to turn on the switch when the actuation lever is pivoted by the user into the actuation position, and the inner edge is not positioned to turn on the switch when the actuation lever is in the non-actuation position. The switch may apply a biasing force to the actuator lever that biases the actuator lever toward the non-actuation position, and the user applies a force to the actuator lever sufficient to overcome the biasing force when the user pivots the actuation lever into the actuation position.

Optionally, the housed portion of the handlebar has a circumference, the actuator lever includes a proximal portion opposite the distal portion, the distal portion is pivotably mounted to the housing along a first outer surface portion of the housed portion of the handlebar, the proximal portion is configured to be pressed upon by the user to pivot the actuator lever from the non-actuation position to the actuation position, and the proximal portion is alongside a second outer surface portion of the housed portion when the actuator lever is in the actuation position. The first outer surface portion is opposite the second outer surface portion along the circumference of the housed portion of the handlebar. Optionally, the proximal portion has a curved inside surface configured to abut and wrap partway around at least a portion of the second outer surface portion of the housed portion of the handlebar when the actuator lever is in the actuation position. Optionally, the distal portion has a first distal portion and a second distal portion, the first distal portion confronts the second distal portion along opposite sides of the housed portion of the handlebar, the first distal portion is pivotably mounted to the housing by a first pivot pin, the second distal portion is pivotably mounted to the housing by a second pivot pin, and the first pivot pin is different from the second pivot pin.

Optionally, the handlebar control includes a flexible lever housing attached to the housing and the actuator lever includes a proximal portion opposite the distal portion, wherein the distal portion is pivotably mounted to the housing, the proximal portion is positioned inside the lever housing, the lever housing is configured to allow the user to press upon the proximal portion through the lever housing when the user pivots the actuator lever from the non-actuation position to the actuation position.

Optionally, the handlebar control includes a turn signal mounted on the housing, and a turn signal actuator mounted on the housing and positioned to be manually actuated by the user. The turn signal actuator turns on the turn signal when actuated by the user.

Optionally, the vehicle includes a plurality of gears, a gear shifter, and a shift actuator. The gear shifter is configured to select one of the plurality of gears. The shift actuator is configured to operate the gear shifter and cause the gear shifter to select a different one of the plurality of gears. Optionally, the handlebar control includes a first actuator configured to instruct the shift actuator to cause the gear shifter to select a higher one of the plurality of gears, and a second actuator configured to instruct the shift actuator to cause the gear shifter to select a lower one of the plurality of gears.

Another exemplary embodiment is a handlebar control for use with a vehicle operated by a user. The vehicle includes a handlebar operable to steer the vehicle and at least one brake configured to slow the vehicle when the at least one brake is activated. The handlebar control includes an actuator assembly mounted on the handlebar and configured to be actuated manually by a hand of the user. When actuated, the actuator assembly is configured to activate the at least one brake and/or another component of the vehicle (e.g., a clutch or a brake light switch). Optionally, the handlebar control includes a palm rest mounted on the handlebar and configured to allow the user to rest a palm of the hand against the palm rest while the user operates the vehicle. Optionally, the palm rest is rotatable with respect to the handlebar to change a circumferential distance around the handlebar between the palm rest and the actuator assembly. Optionally, the handlebar control includes a housing configured to be mounted on the handlebar. A housed portion of the handlebar is positioned inside the housing and the palm rest is mounted on the housing. Optionally, the actuator assembly includes an actuator lever and a brake actuator. The actuator lever includes a distal portion pivotably mounted to the housing and wrapping partway around the housed portion of the handlebar. The actuator lever is pivotable between actuation and non-actuation positions with respect to the housing. The brake actuator is configured to activate the at least one brake when actuated. The brake actuator is not actuated when the actuation lever is in the non-actuation position. The brake actuator is positioned to be actuated by the actuator lever when the actuation lever is pivoted manually by the user into the actuation position.

Another exemplary embodiment is a bicycle including at least one brake, a handlebar, and a handlebar control. The at least one brake is configured to slow the bicycle when the at least one brake is activated. The handlebar is operable by a user to steer the vehicle. The handlebar control includes a housing, an actuator lever, and a brake actuator. The housing is configured to be mounted on the handlebar with a housed portion of the handlebar being positioned inside the housing. The actuator lever includes a distal portion pivotably mounted to the housing and wrapping partway around the housed portion of the handlebar. The actuator lever is pivotable between actuation and non-actuation positions with respect to the housing. The brake actuator is configured to activate the at least one brake when actuated. The brake actuator is not actuated when the actuation lever is in the non-actuation position. The brake actuator is positioned to be actuated by the actuator lever when the actuation lever is pivoted manually by the user into the actuation position.

Optionally, the handlebar of the bicycle has a left free end and a right free end, the handlebar control is a right handlebar control mounted on the right free end of the handlebar, and the bicycle includes a left handlebar control mounted on the left free end of the handlebar. The left handlebar control is a mirror image of the right handlebar control.

Optionally, the handlebar control of the bicycle includes a palm rest mounted on the housing. The palm rest is configured to allow the user to rest a palm against the palm rest while the user operates the bicycle. Optionally, the palm rest is rotatable with respect to the housing to position the palm rest such the user may pivot the actuator lever while the user's palm is resting on the palm rest.

Optionally, the bicycle includes a brake light and the handlebar control includes a brake light switch configured to turn on the brake light when the brake actuator is being actuated and to turn off the brake light when the brake actuator is not being actuated.

Optionally, the brake actuator of the bicycle includes a switch that when turned on actuates the brake actuator, the actuator lever includes a cutout portion with an inner edge, the switch is at least partially positioned within the cutout portion, and the inner edge is positioned to turn on the switch when the actuation lever is pivoted by the user into the actuation position. Optionally, the switch applies a biasing force to the actuator lever that biases the actuator lever toward the non-actuation position, and the user applies a force to the actuator lever sufficient to overcome the biasing force when the user pivots the actuation lever into the actuation position.

Optionally, the handlebar of the bicycle has a free end portion with a circumference and the actuator lever includes a proximal portion opposite the distal portion. The housing is configured to be mounted on the free end portion, the distal portion is pivotably mounted to the housing along a first outer surface portion of the free end portion of the handlebar, the proximal portion is configured to be pressed upon by the user to pivot the actuator lever from the non-actuation position to the actuation position, and the proximal portion is alongside a second outer surface portion of the free end portion when the actuator lever is in the actuation position. The first outer surface portion is opposite the second outer surface portion along the circumference of the free end portion of the handlebar.

Optionally, the bicycle includes a turn signal and the handlebar control includes a turn signal actuator mounted on the housing and positioned to be manually actuated by the user. The turn signal actuator turns on the turn signal when actuated by the user.

Optionally, the bicycle includes a plurality of gears, a gear shifter, and a shift actuator. The gear shifter is configured to select one of the plurality of gears. The shift actuator is configured to operate the gear shifter and cause the gear shifter to select a different one of the plurality of gears. Optionally, the handlebar control includes a first actuator configured to instruct the shift actuator to cause the gear shifter to select a higher one of the plurality of gears, and a second actuator configured to instruct the shift actuator to cause the gear shifter to select a lower one of the plurality of gears.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
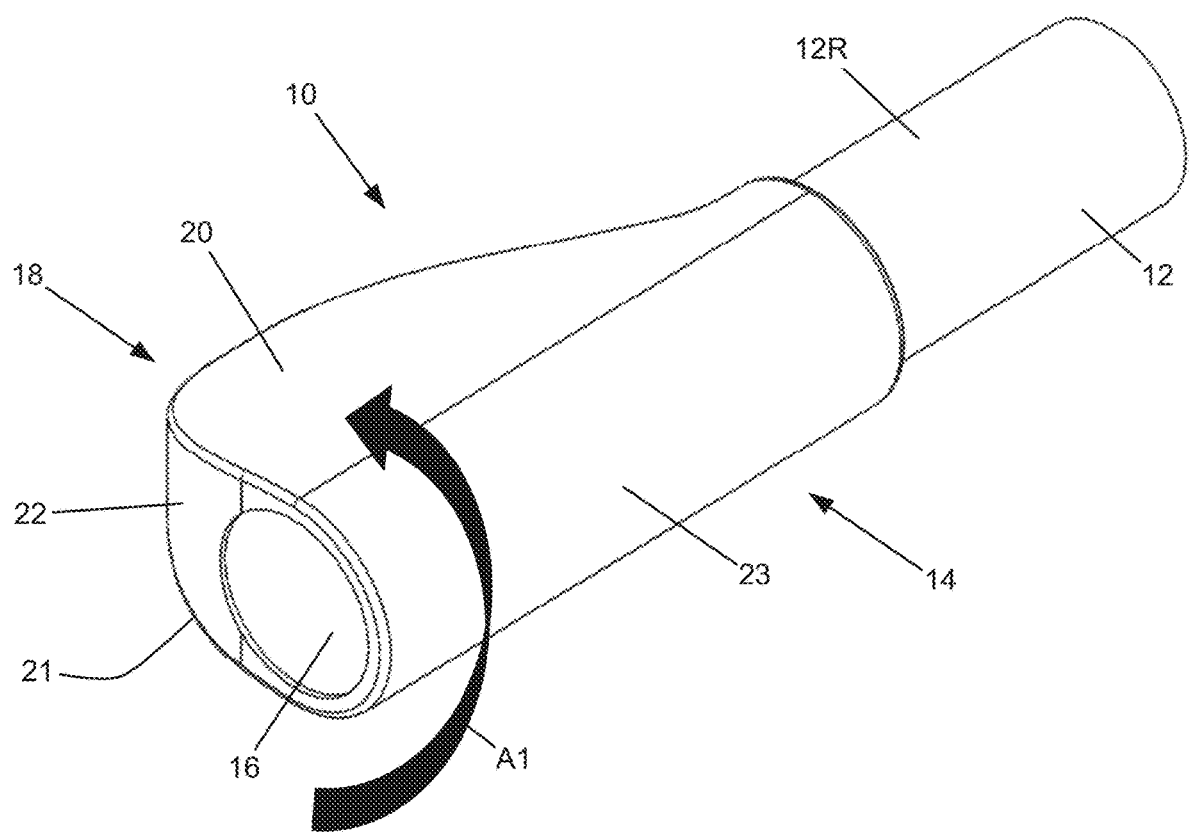
FIG. 1 illustrates a first perspective view an electronic handlebar control according to a first embodiment.
Figure 2:
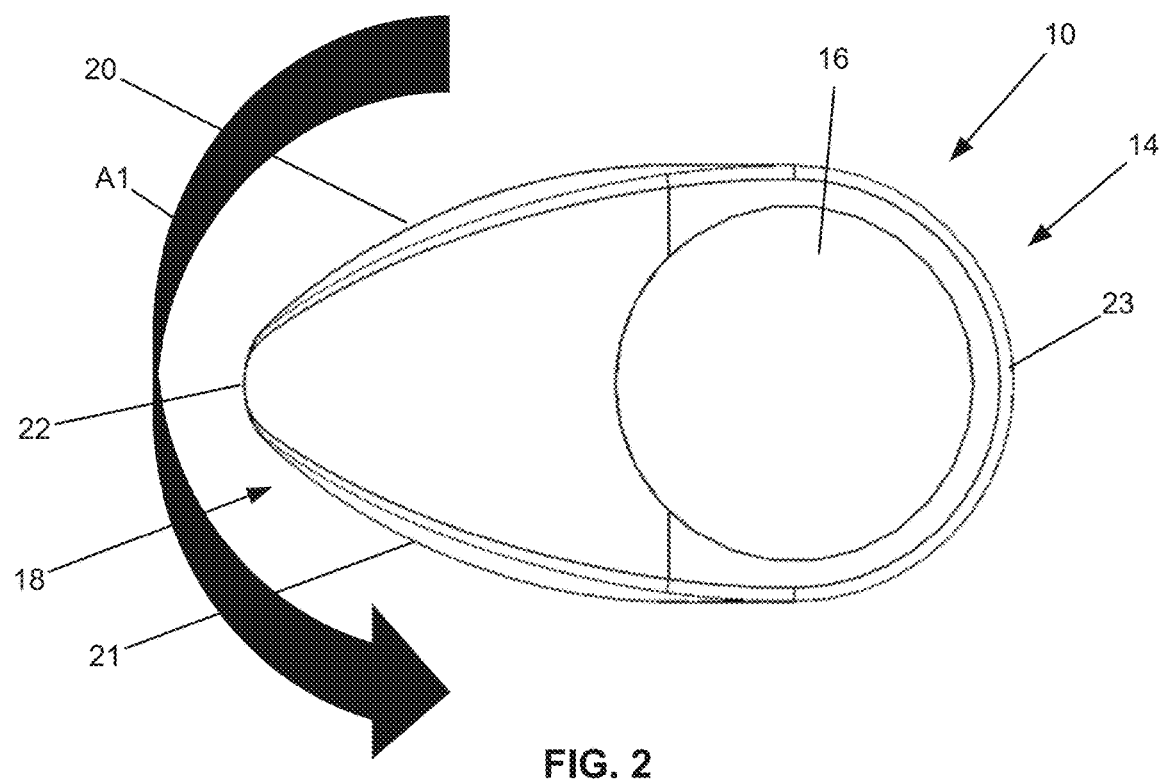
FIG. 2 illustrates an end view of the electronic handlebar control of FIG. 1.
Figure 3:
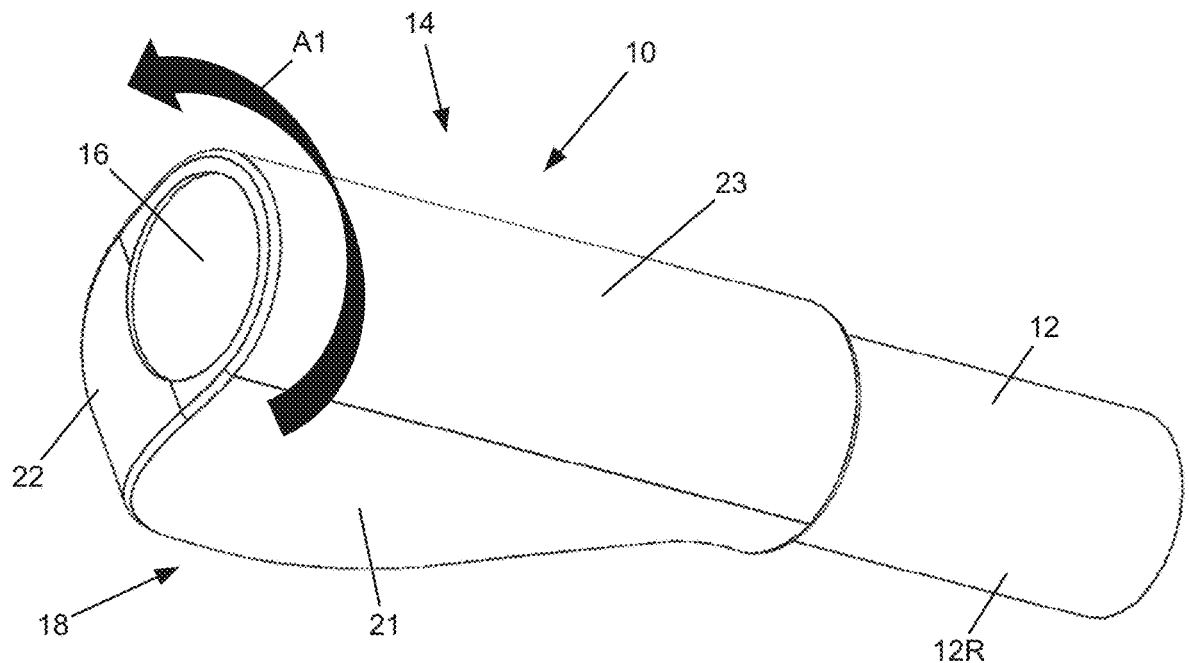
FIG. 3 illustrates a second perspective view of the electronic handlebar control of FIG. 1.
Figure 10:
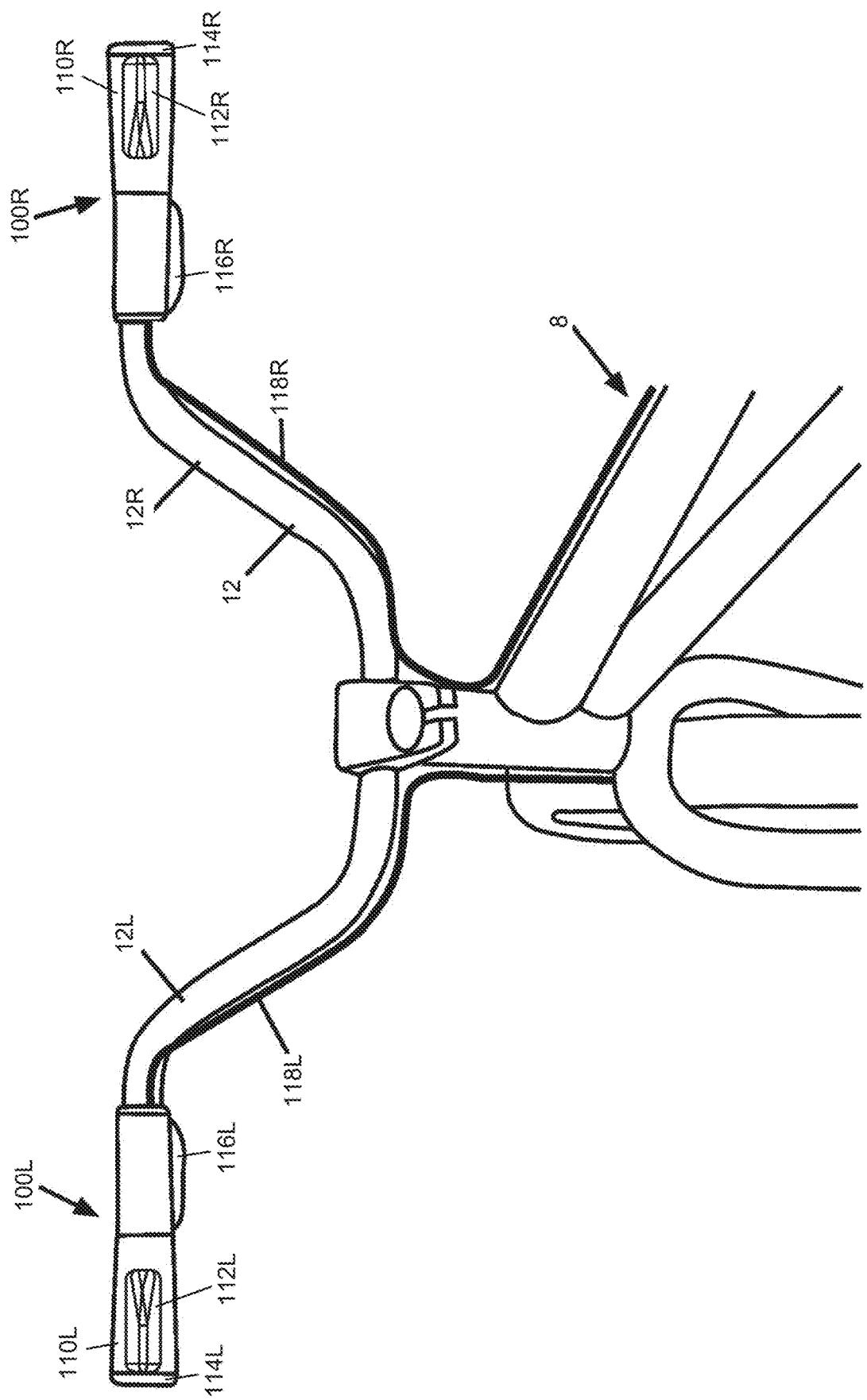
FIG. 10 is an illustration of right and left handlebar controls mounted on the handlebar of a bicycle.

An electronic handlebar control 10 according to a first embodiment is shown in FIGS. 1, 2, and 3. The electronic handlebar control 10 is attached to or part of a handlebar 12 of a vehicle that is steered by the handlebar 12. Non-limiting examples of such a vehicle include a bicycle 8 (see FIGS. 10 and 11), motorcycle, moped, and the like. For ease of illustration, the handlebar 12 will be described as being a component of the bicycle 8 (see FIGS. 10 and 11) and as being operable to steer the bicycle 8. The handlebar 12 is configured to be steered manually by a user. Referring to FIG. 10, the handlebar 12 has a right-hand side 12R and a left-hand side 12L. Returning to FIGS. 1, 2, and 3, the electronic handlebar control 10 may be attached to or part of the right-hand or left-hand sides 12R and 12L (see FIG. 10). Optionally, the right-hand side 12R may include the electronic handlebar control 10 and the left-hand side 12L may include another electronic handlebar control that is a mirror image of the electronic handlebar control 10. Thus, for ease of illustration, the electronic handlebar control 10 has been illustrated and will be described as being attached to or part of the right-hand side 12R of the handlebar 12.

Figure 4:
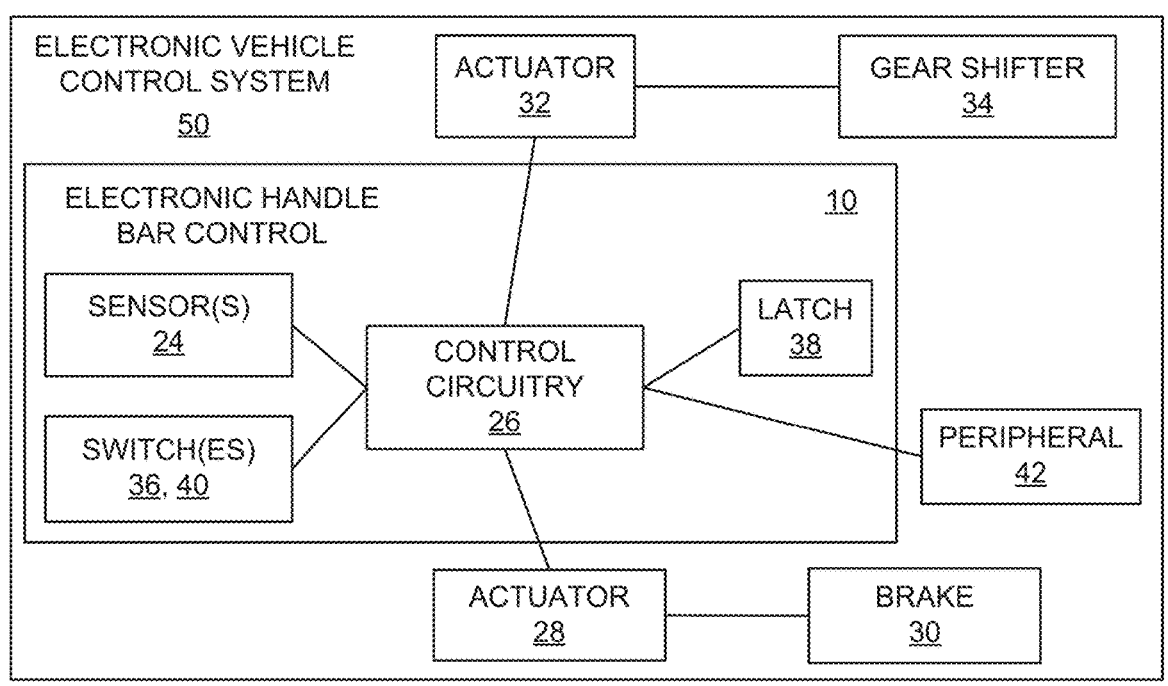
FIG. 4 illustrates a schematic view of the electronic handlebar control.

The electronic handlebar control 10 is operable to control various functional aspects of the bicycle 8 (see FIGS. 10 and 11), such as turning on and off lights, shifting gears, and/or applying a brake. The electronic handlebar control 10 may be part of an electronic vehicle control system 50 (see FIGS. 4 and 11). Referring to FIG. 4, the electronic handlebar control 10 includes internal electronic components for receiving user input and transmitting electronic signals to other components and devices in the electronic vehicle control system 50.

Referring to FIGS. 1 and 3, the electronic handlebar control 10 is operable to rotate relative to the right-hand side 12R of the handlebar 12. Rotation of the electronic handlebar control 10 controls various functional aspects of the bicycle 8 (see FIGS. 10 and 11), as described below. A main body 14 of the electronic handlebar control 10 extends axially along a length of the handlebar 12 at or near a free end 16 of the right-hand side 12R. The main body 14 may at least partially surround the handlebar 12 in some embodiments. The handlebar 12 may at least partially extend through the main body 14. Bearings (not shown) may be provided between the main body 14 and the handlebar 12 to help minimize friction when the electronic handlebar control 10 rotates relative to the handlebar 12.

As mentioned above, the first embodiment of the electronic handlebar control 10 illustrated in FIGS. 1-3 is configured to be positioned on or formed in the right-hand side 12R of the handlebar 12. Thus, the electronic handlebar control 10 illustrated is a right handlebar control that rotates in a counterclockwise direction (illustrated by a curved arrow "A1") when viewed from the free end 16 (shown in FIGS. 1, 2, and 3) of the right-hand side 12R of the handlebar 12. As mentioned above, optionally, another electronic handlebar control that is a mirror image of the electronic handlebar control 10 may be positioned on or formed in the left-hand side 12L (see FIGS. 5, 6, 10, 12, 15-19, and 22) of the handlebar 12. The left handlebar control may rotate in a clockwise direction when viewed from the free end 16 (shown in FIGS. 1, 2, and 3) of the left-hand side 12L (see FIGS. 5, 6, 10, 12, 15-19, and 22) of the handlebar 12. Referring to FIGS. 1-3, in alternate embodiments, the right electronic handlebar control 10 may be configured to rotate in an opposite direction (i.e., the right handlebar control may be rotatable in a clockwise direction) in some embodiments.

Figure 5:
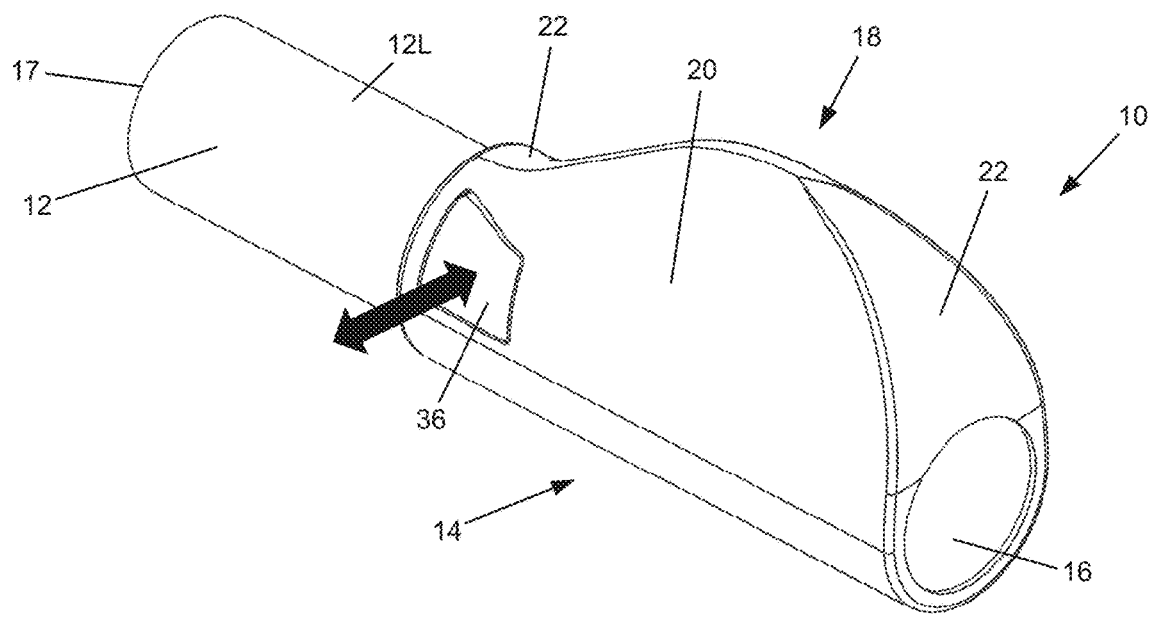
FIG. 5 illustrates a first perspective view of an electronic handlebar control according to a second embodiment.
Figure 6:
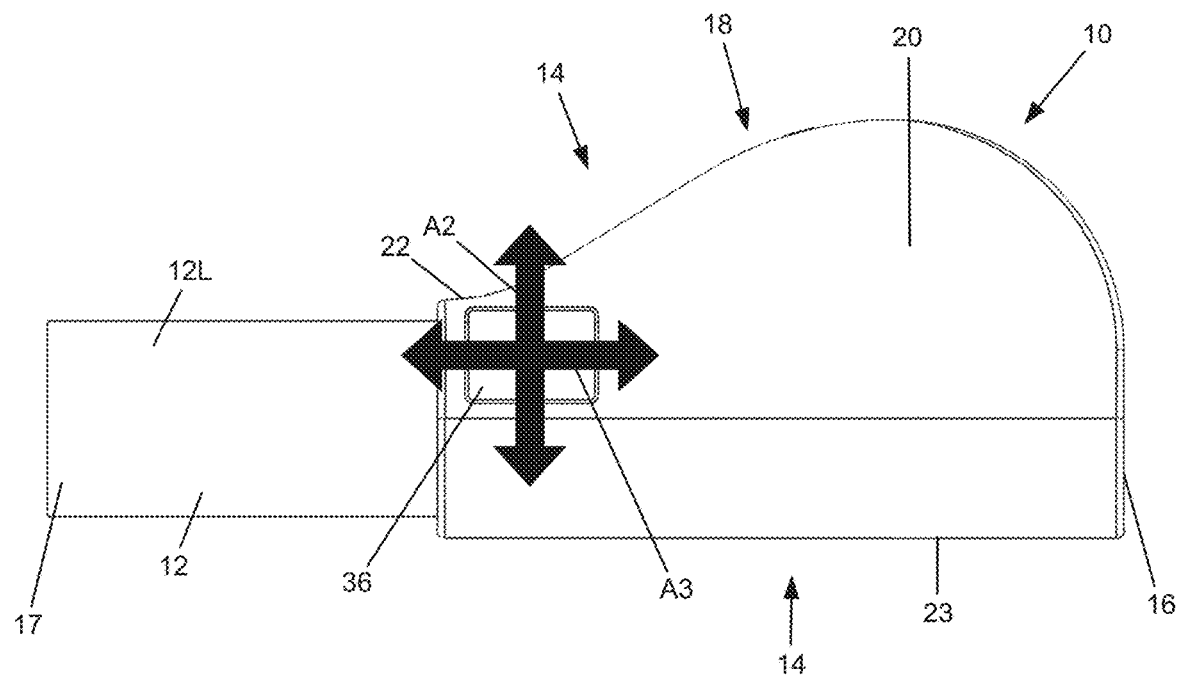
FIG. 6 illustrates a top plan view of the electronic handlebar control of FIG. 5.

FIGS. 5 and 6 illustrate a second embodiment of the electronic handlebar control 10 configured to be positioned on or formed in the left-hand side 12L of the handlebar 12. Referring to FIGS. 5 and 6, the left electronic handlebar control 10 is configured to rotate in the clockwise direction when viewed from the free end 16 of the left-hand side 12L of the handlebar 12. Optionally, another electronic handlebar control that is a mirror image of the electronic handlebar control 10 illustrated in FIGS. 5 and 6 may be positioned on or formed in the right-hand side 12R (see FIGS. 1, 3, and 7-10) of the handlebar 12. The right handlebar control may rotates in the counterclockwise direction when viewed from the free end 16 (shown in FIGS. 1, 2, and 3) of the right-hand side 12R (see FIGS. 1, 3, and 7-10) of the handlebar 12. Referring to FIGS. 5 and 6, in alternate embodiments, the left electronic handlebar control 10 may rotate in an opposite direction (i.e., the left handlebar control may be rotatable in the counterclockwise direction) in some embodiments.

Referring to FIGS. 1-3, a paddle portion 18 may protrude from the main body 14 to help facilitate user rotation of the electric handlebar control 10. In the present embodiment, the paddle portion 18 has an elongated elliptical shape projecting in a rearward direction toward a seat (not shown) of the bicycle 8 (see FIGS. 10 and 11). The paddle portion 18 may include a substantially flat or slightly curved upper surface 20 for supporting the user's palm. The paddle portion 18 may have a convex shape in some embodiments, as shown in FIG. 2, or may have a concave shape in other embodiments, as shown in FIG. 5 (which illustrates the second embodiment). As shown in FIG. 5, the paddle portion 18 may have an offset curved profile when viewed from overhead. The offset curved profile tapers laterally from a thickest part near the free end 16 of the left-hand side 12L toward an inward portion 17 of the handlebar 12 to accommodate the user's thumb when the user grips the electronic handlebar control 10. Referring to FIGS. 1-3, the paddle portion 18 may include a medial portion 22 between the upper surface 20 and a lower surface 21 opposite to the upper surface.

The paddle portion 18 may have a different shape in other embodiments. The paddle portion 18 may have a uniform profile when viewed from overhead. The uniform profile may be a substantially rectangular profile with rounded corners. Alternatively, the uniform profile may be a curved profile having a thickest part near the center of the main body 14 that tapers toward the free end 16 of the right-hand side 12R and the inward portion 17 of the right-hand side 12R of the handlebar 12. The lower surface 21 may be concave or otherwise configured to engage the user's fingertips when the user grips the electronic handlebar control 10.

A front side 23 of the main body 14 has a rounded cylindrical shape to allow the user's fingers to wrap around and grip the electronic handlebar control 10. The front side 23 may have grooves or indentations (not shown) to accommodate each of the user's individual fingers.

One or more sensors 24 (see FIG. 4) in the electronic handlebar control 10 may detect a rotational position of the main body 14 relative to the handlebar 12. Referring to FIG. 4, the one or more sensors 24 may be electronically coupled to control circuitry 26 in the electronic handlebar control 10. The one or more sensors 24 may transmit an electric signal to the control circuitry 26 in the electronic handlebar control 10 indicating the detected rotational position. In response to receiving a signal indicating the detected rotational position from the one or more sensors 24, the control circuitry 26 may send a control signal for controlling one or more devices on the bicycle 8 (see FIGS. 10 and 11), such as brakes, lights, or switching gears.

The control circuitry 26 may transmit control signals to one or more motors, such as an actuator 28 or an actuator 32, that operate the one or more devices on the vehicle. The actuator 28 is a motor that is operable to actuate a brake 30 configured to slow or stop the bicycle 8 (see FIGS. 10 and 11). The control circuitry 26 may send a control signal controlling the position of the actuator 28 based on the detected rotational position of the main body 14. The control signal may cause the actuator 28 to apply the brake 30 proportionally to the detected rotational position of the electronic handlebar control 10. Partially rotating the electronic handlebar control 10 may operate to cause the brake 30 to slow the bicycle 8 (see FIGS. 10 and 11), while fully rotating the electronic handlebar control 10 may operate to cause the brake 30 to stop the bicycle 8 (see FIGS. 10 and 11).

The bicycle 8 (see FIGS. 10 and 11) may have a plurality of gears (e.g., a high gear, a lower gear, one or more intermediate gears, and the like). The actuator 32 is a motor that is operable to cause a gear selector or shifter 34 to change gears on the bicycle 8 (see FIGS. 10 and 11). The control circuitry 26 may send a control signal causing the actuator 32 to engage a different gear when the detected rotational position meets or exceeds a predetermined threshold rotational position. The electronic handlebar control 10 may be rotated in different directions to the increment or decrement the selected gear. For example, rotating the electronic handlebar control 10 upward (e.g., clockwise) may cause the gear shifter 34 to change to a higher gear, while rotating the electronic handlebar control downward (e.g., counterclockwise) may cause the gear shifter 34 to change to a lower gear.

Figure 11:
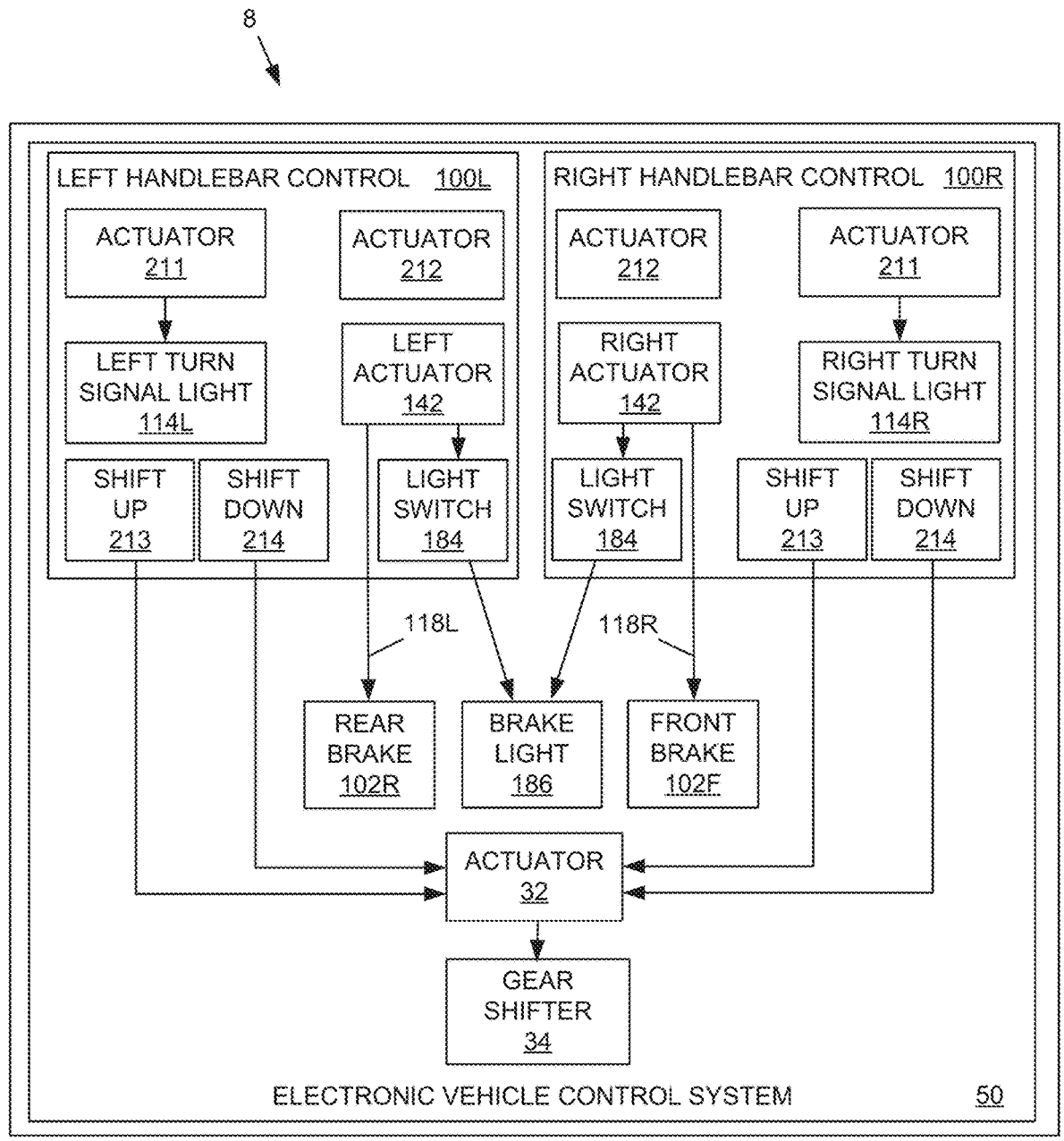
FIG. 11 is a block diagram of an electronic vehicle control system for use with the right and left handlebar controls of FIG. 10.

Although FIG. 4 illustrates the control circuitry 26 as being included within the electronic handlebar control 10, the control circuitry 26 may be located elsewhere, such as internally within the handlebar 12 or at a more remote location on the bicycle 8 (see FIGS. 10 and 11). When the handlebar 12 is equipped with more than one electronic handlebar control 10, the control circuitry 26 may receive electronic signals from each of the electronic handlebar controls.

As mentioned above, FIGS. 5 and 6 illustrate the second embodiment of the electronic handlebar control 10. Referring to FIGS. 5 and 6 (which illustrate the left-hand side 12L of the handlebar 12), the electronic handlebar control 10 may include an electronic switch 36. The switch 36 is a selective release mechanism operable to enable and disable rotation of the electronic handlebar control 10 relative to the handlebar 12. When the switch 36 is in a resting state (i.e., not depressed), the electronic handlebar control 10 is mechanically locked in position and prevented from rotating relative to the handlebar 12. On the other hand, when the switch 36 is depressed, the electronic handlebar control 10 is unlocked and may be rotated by the user to control various aspects of the bicycle 8 (see FIGS. 10 and 11).

Referring to FIG. 4, the electronic handlebar control 10 may include a latch 38 (or other mechanical fastening device known to those of ordinary skill in the art) that selectively engages or disengages to lock and unlock, respectively, rotation of the electronic handlebar control 10 relative to the handlebar 12 in response to operation of the switch 36. Selective unlocking or locking rotation of the electronic handlebar control 10 is a safety feature that prevents accidental rotation of the electronic handlebar control 10 due to encountering unexpected bumps or variations in terrain. The switch 36 shown in FIGS. 5 and 6 is of a pushbutton type, but the type of the switch 36 may be different, as described below.

In some embodiments, the control circuitry 26 may be configured to ignore rotation of the electronic handlebar control 10 (or inputs from other switches) unless the switch 36 is depressed. The switch 36 may be connected to digital logic circuitry that prevents an input signal (e.g., detected rotational position of the electronic handlebar control 10, input signal from other switches, and the like) from passing to the control circuitry 26 unless the switch 36 is depressed. Alternatively, the switch 36 may be electrically connected to an enable line of the control circuitry 26 so that some or all of the control circuitry 26 are deactivated or disabled unless the switch 36 is depressed.

The switch 36 may be electronically coupled to the control circuitry 26 and may be configured to send an electronic signal to the control circuitry 26 when the switch 36 is depressed. In response to receiving the electronic signal, the control circuitry 26 may send a control signal causing the latch 38 to engage or disengage for selectively allowing or preventing rotation of the electronic handlebar control 10. Alternatively, the switch 36 may be electronically and operatively coupled to the latch 38 without the intervening control circuitry 26.

The switch 36 may directly operate various functional aspects of the bicycle 8 (see FIGS. 10 and 11) in some embodiments. Depressing the switch 36 may cause the actuator 28 to engage the bicycle's brakes 30, or cause the actuator 32 to operate the gear shifter 34 to change the currently selected gear. In some embodiments, the switch 36 may operate a peripheral device 42. The peripheral device 42 may be a device attached to or associated with the bicycle 8 (see FIGS. 10 and 11), such as a headlight, a taillight, or a turn signal, by way of non-limiting examples. The switch 36 may be electronically coupled to the control circuitry 26 that operates the peripheral device 42. Alternatively, the switch 36 may directly operate or control the peripheral device 42 without the intervening control circuitry 26. In one embodiment, the switch 36 may be a rocker switch that turns a headlight on and off. In another embodiment, the switch 36 is a selector switch that may be rotated or moved laterally to select a desired gear.

Referring to FIGS. 5 and 6, in the second embodiment, the switch 36 is located on the upper surface 20 and positioned toward a side of the electronic handlebar control 10 located toward the inward portion 17 of the left-hand side 12L of the handlebar 12. The switch 36 is sized, shaped, and positioned so that the user may conveniently access the switch 36 with his/her thumb. The switch 36 may have a different shape or placement on the electronic handlebar control 10 in other embodiments. Referring to FIG. 5, the switch 36 may be moved to a different position on the upper surface 20 of the paddle portion 18 (as illustrated by double-headed arrows "A2" and "A3" shown in FIG. 6) or the switch 36 may be positioned on the medial portion 22 of the paddle.

Figure 7:
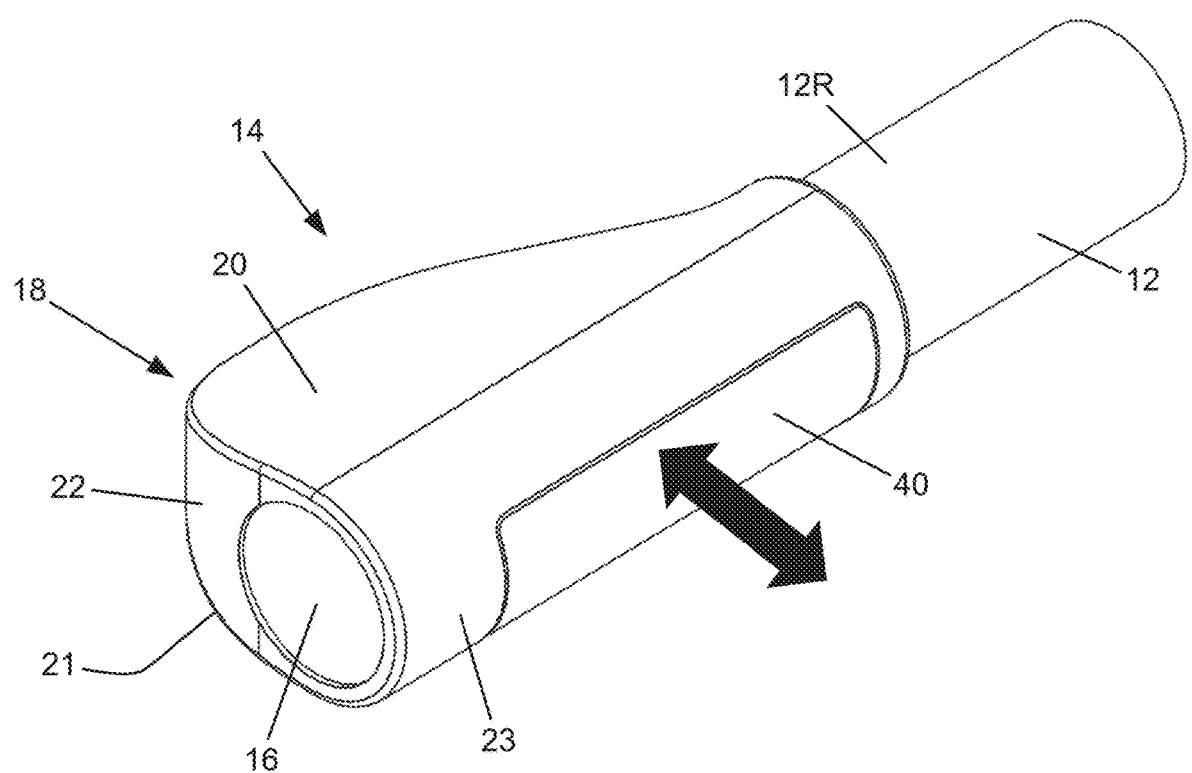
FIG. 7 illustrates a first perspective view of an electronic handlebar control according to a third embodiment.

FIG. 7 illustrates a third embodiment of the electronic handlebar control 10 configured to be positioned on or formed in the right-hand side 12R of the handlebar 12. Referring to FIG. 7, a switch 40 may be positioned on the front side 23 of the main body 14. The switch 40 may be provided instead of or in addition to the switch 36 (see FIGS. 4-6). The switch 40 may be operable to control the various aspects of the bicycle 8 (see FIGS. 10 and 11) described above with reference to the switch 36 (see FIGS. 4-6). The switch 40, in this third embodiment, has an elongated shape projecting across and conforming to the shape of the front side 23 of the main body 14 so that the user may activate the switch 40 with one or more of the fingers other than the thumb.

Figure 8:
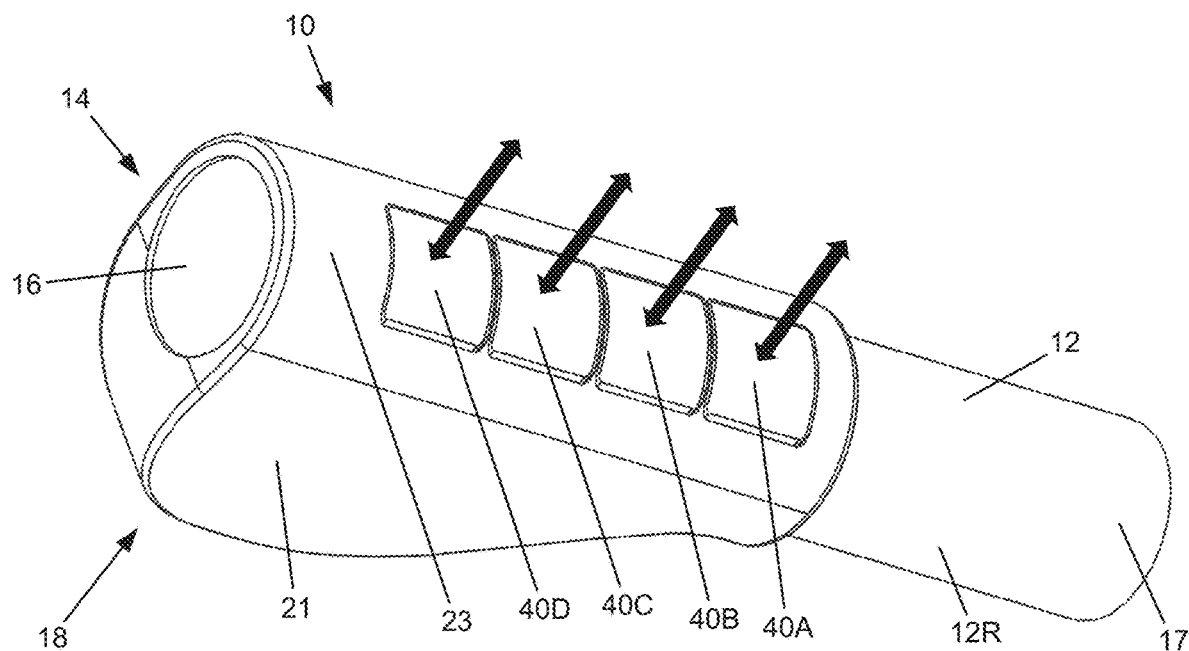
FIG. 8 illustrates a first perspective view of an electronic handlebar control according to a fourth embodiment.
Figure 9:
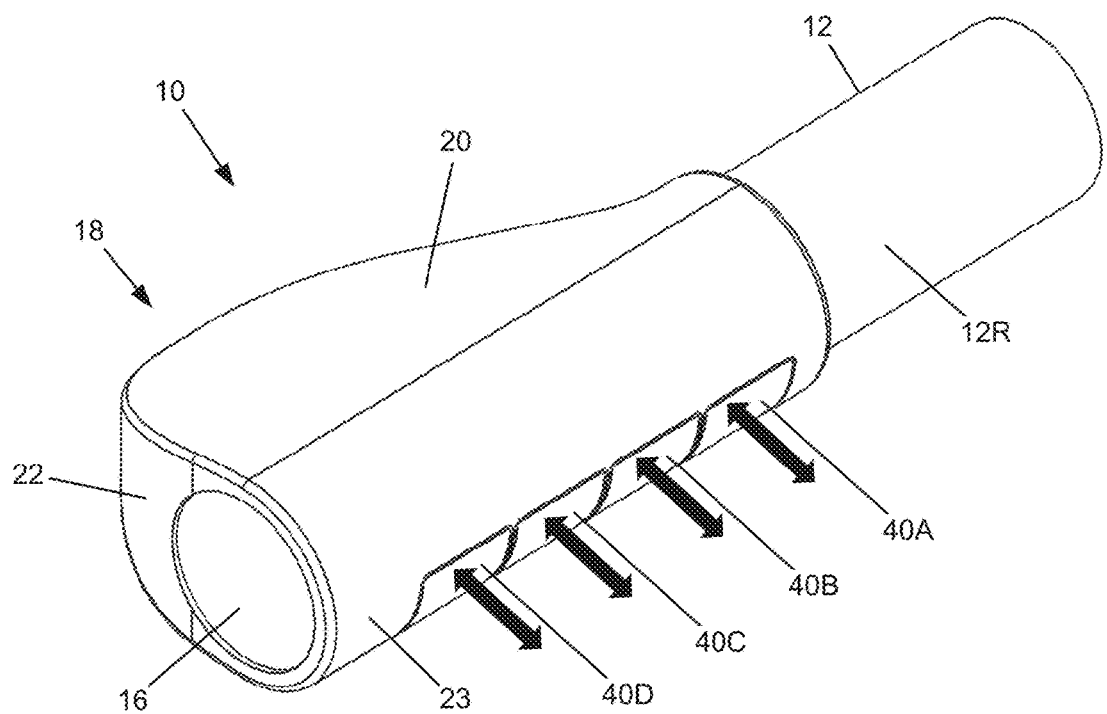
FIG. 9 illustrates a second perspective view of the electronic handlebar control of FIG. 8.

FIGS. 8 and 9 illustrate a fourth embodiment of the electronic handlebar control 10 configured to be positioned on or formed in the right-hand side 12R of the handlebar 12. Referring to FIGS. 8 and 9, the electronic handlebar control 10 may include a plurality of switches 40A-40D provided on the front side 23. Each of the plurality of switches 40A-40D may correspond to a different function. For example, one of the switches 40A-40D may increment the selected gear of the bicycle 8 (see FIGS. 10 and 11) and another of the switches 40A-40D may decrement the selected gear of the bicycle 8 (see FIGS. 10 and 11). As another non-limiting example, one of the switches 40A-40D may interact with the latch 38 (see FIG. 4) to selectively allow or prevent rotation of electronic handlebar control 10. Other non-limiting examples of functions associated with the plurality of switches 40A-40D may include activating/deactivating lights (e.g., turn signals, headlights, and/or taillights), activating a horn, and activating/deactivating an electric motor for propelling the bicycle 8 (see FIGS. 10 and 11).

Each of the plurality of switches 40A-40D conforms to the cylindrical contour of the main body 14. The plurality of switches 40A-40D are arranged in a row along the length of the main body 14 and disposed toward the lower surface 21 of the main body 14. The plurality of switches 40A-40D are arranged on the main body 14 so that the user's fingertips may easily activate any of the plurality of switches 40A-40D when the user grips the electronic handlebar control 10. The electronic handlebar control 10 may have a different number of switches other than four. Some of the plurality of switches 40A-40D may be sized or shaped differently than others of the plurality of switches 40A-40D. The switch 40A, for example, may be a large rectangular shaped main switch, while others of the switches 40B-40D may be smaller secondary switches.

As mentioned above, referring to FIG. 4, the bicycle 8 (see FIGS. 10 and 11) may be equipped with two electronic handlebar controls 10, which are components of the electronic vehicle control system 50. Referring to FIG. 3, a right one of the two electronic handlebar controls 10 may be positioned near the free end 16 of the right-hand side 12R of the handlebar 12. Similarly, referring to FIG. 5, a left one of the two electronic handlebar controls 10 may be positioned near the free end 16 of the left-hand side 12L of the handlebar 12. One of the two electronic handlebar controls 10 may control different aspects of the bicycle 8 (see FIGS. 10 and 11) than the other of the two electronic handlebar controls 10. For example, the right electronic handlebar control 10 may include the switch 36, which may be implemented as a safety switch that selectively allows rotation of the paddle portion 18. On the other hand, the left electronic handlebar control 10 may include one or more of the plurality of switches 40A-40D that control one or more peripheral devices (e.g., the peripheral device 42) or shift gears of the bicycle 8 (see FIGS. 10 and 11). In another example, one of the electronic handlebar controls 10 may control activating a first wheel brake and incrementing a currently selected gear whereas the other of the electronic handlebar controls may control activating a second wheel brake and decrementing the currently selected gear.

FIG. 10 illustrates right and left handlebar controls 100R and 100L mounted on the handlebar 12 of the vehicle that is steered by the handlebar 12. As mentioned above, the vehicle may include the bicycle 8, a motorcycle, a moped, and the like. For ease of illustration, the handlebar 12 will be described as being a component of the bicycle 8 and as being operable to steer the bicycle 8. As mentioned above, the handlebar 12 is configured to be steered manually by the user. The right handlebar control 100R is positioned at or near the free end 16 (see FIGS. 1-3 and 7-9) of the right-hand side 12R of the handlebar 12. The left handlebar control 100L is positioned at or near the free end 16 (see FIGS. 5, 6, 15, and 19) of the left-hand side 12L of the handlebar 12.

Referring to FIG. 11, in this embodiment, the brakes 30 (see FIG. 4) may include front and rear wheel brakes 102F and 102R. As is apparent to those of ordinary skill in the art, the right handlebar control 100R may control one of front and rear wheel brakes 102F and 102R and the left handlebar control 100L may control the other of the front and rear wheel brakes 102F and 102R. Alternatively, only one of the right and left handlebar controls 100R and 100L may be mounted on the handlebar 12 and used to control the brakes 30 (see FIG. 4).

Referring to FIG. 10, the left handlebar control 100L includes a left grip housing 110L, a left palm rest 112L, a left turn signal light 114L, and a left actuator assembly 116L. Similarly, the right handlebar control 100L includes a right grip housing 110R, a right palm rest 112R, a right turn signal light 114R, and a right actuator assembly 116R. The left actuator assembly 116L may be connected to a cable 118L and the right actuator assembly 116R may be connected to a cable 118R. The cables 118L and 118R are each connected to another component of the bicycle 8.

In the embodiment illustrated, the right handlebar control 100R is a mirror image of the left handlebar control 100L. Therefore, for the ease of illustration, only the left handlebar control 100L will be described in detail. However, the right handlebar control 100R may include like structures.

Figure 12:
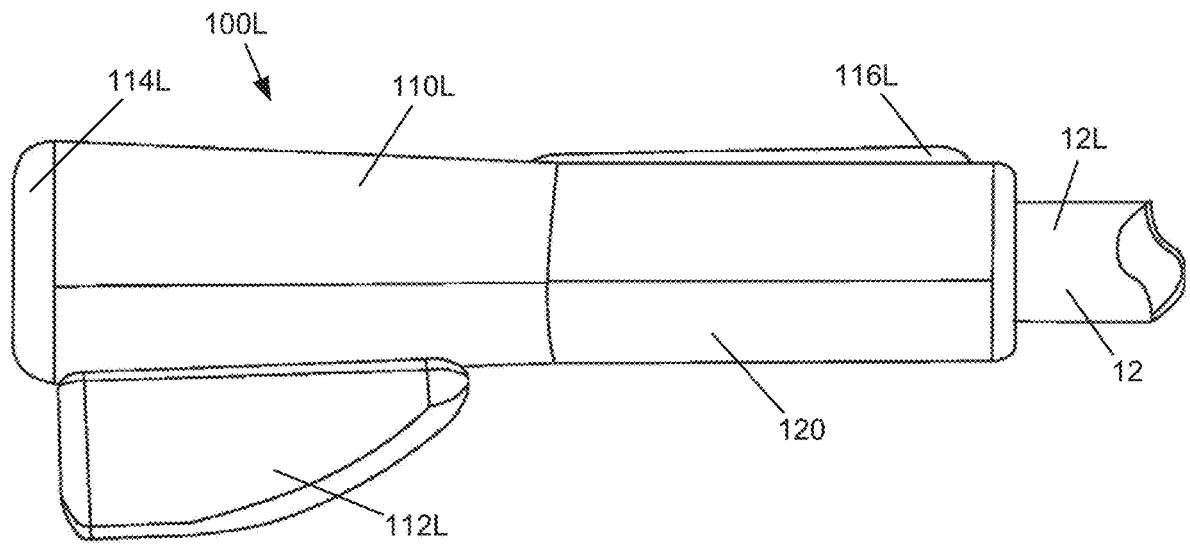
FIG. 12 is a top view of the left handlebar control of FIG. 10.

The left and right grip housings 110L and 110R may each be generally cylindrical in shape. Referring to FIG. 12, the left grip housing 110L has an outer surface 120 opposite an inside surface 121 (see FIG. 21). The outer surface 120 is configured to allow the user's left hand to grip the left grip housing 110L and the user's fingers to wrap at least partway around the left grip housing 110L to actuate the left actuator assembly 116L. Similarly, referring to FIG. 10, the outer surface 120 of the right grip housing 110R is configured to allow the user's right hand to grip the right grip housing 110R and the user's fingers to wrap at least partway around the right grip housing 110R to actuate the right actuator assembly 116R.

Figure 15:
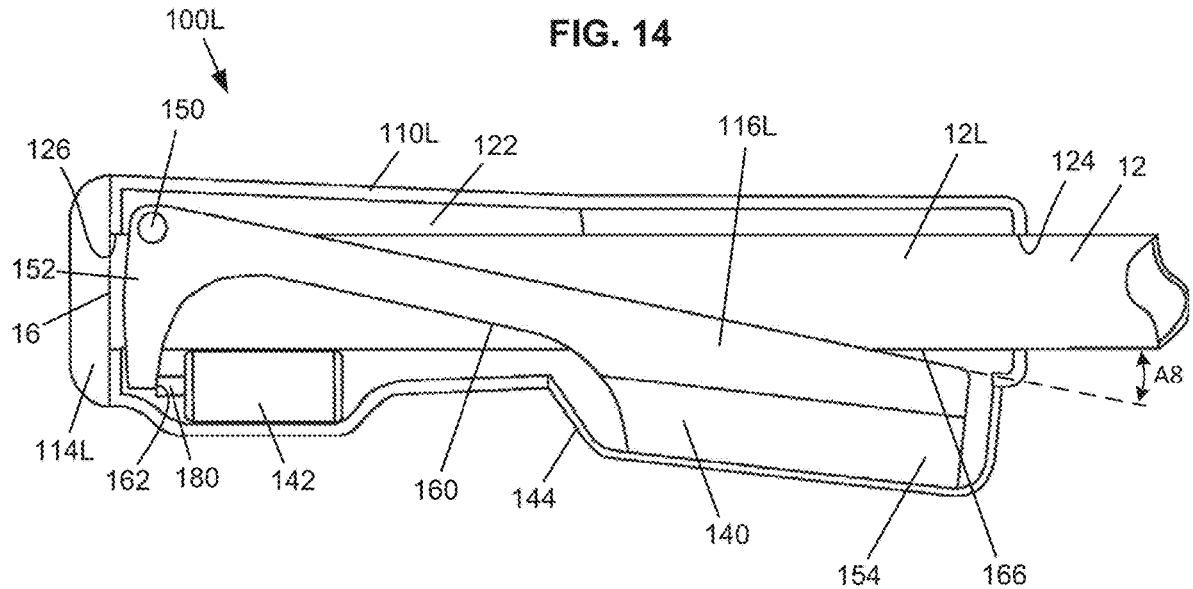
FIG. 15 is a cross-sectional bottom view of the left handlebar control of FIG. 10.

Referring to FIG. 15, the left grip housing 110L may have a channel 122 formed therein through which the left-hand side 12L of the handlebar 12 extends. In the embodiment illustrated, the channel 122 has a proximal opening 124 opposite a distal opening 126. The left-hand side 12L of the handlebar 12 is inserted into the proximal opening 124 and extends toward the distal opening 126. While, as shown in FIG. 15, the free end 16 of the left-hand side 12L of the handlebar 12 may be positioned within the distal opening 126, the free end 16 of the left-hand side 12L does not extend outwardly through the distal opening 126. Instead, the left turn signal light 114L covers the distal opening 126 and prevents the free end 16 of the left-hand side 12L from extending outwardly through the distal opening 126.

Figure 13:
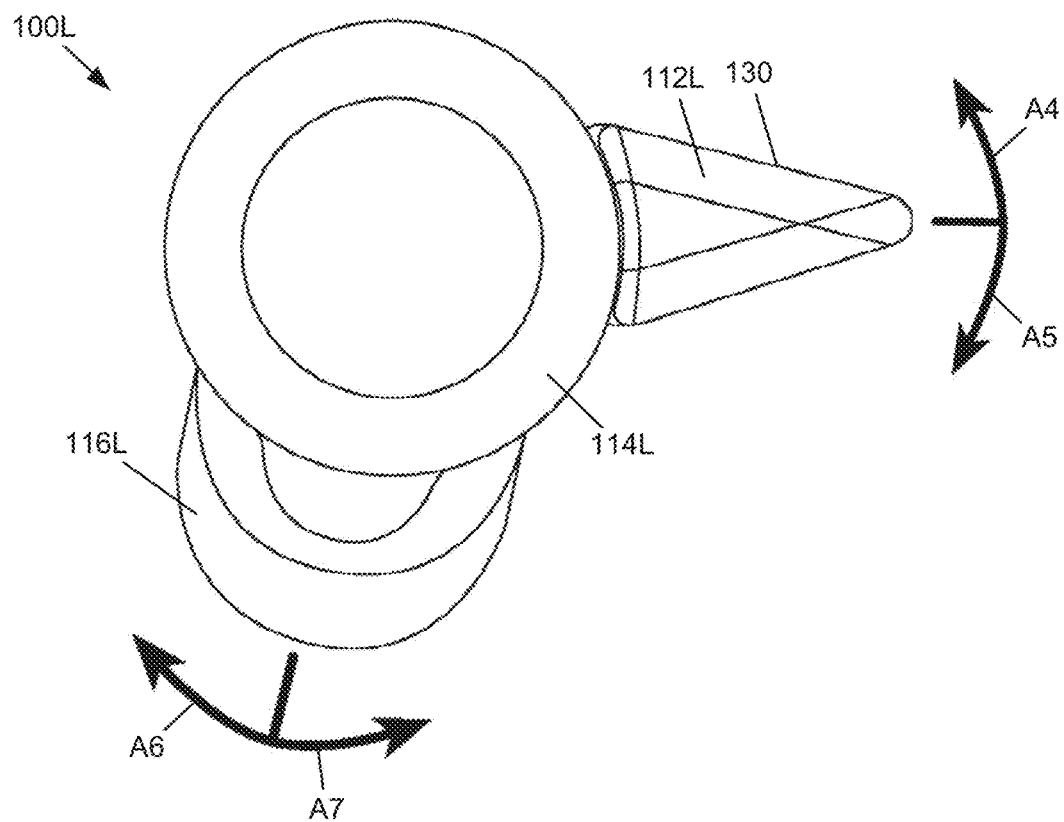
FIG. 13 is a distal end view of the left handlebar control of FIG. 10.
Figure 14:
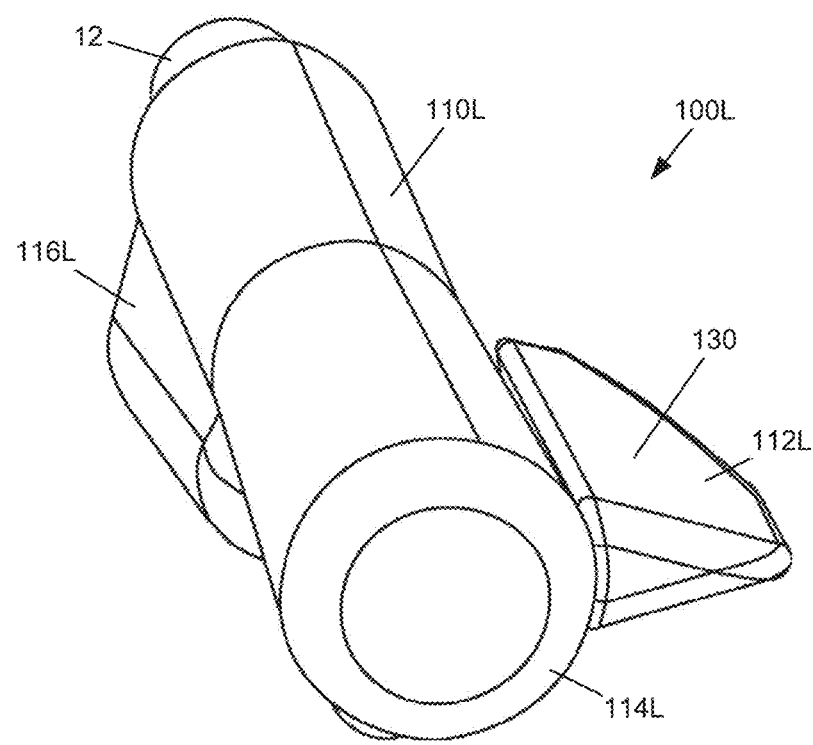
FIG. 14 is a perspective view of the left handlebar control of FIG. 10.

Referring to FIG. 13, the left palm rest 112L is mounted on the left grip housing 110L. The left palm rest 112L may be configured to be adjustable with respect to the left grip housing 110L (see FIGS. 10, 12, 14-18, 20, and 21). For example, the left palm rest 112L may be rotatable with respect to the left grip housing 110L (see FIGS. 10, 12, 14-18, 20, and 21) in directions identified by curved arrows "A4" and "A5." The left palm rest 112L is configured such that the user may place the palm of the user's left hand on the left palm rest 112L. Thus, the left palm rest 112L may include an upwardly facing surface 130 that receives the user's left palm. Optionally, the upwardly facing surface 130 may be substantially flat or contoured to comfortably receive the user's left palm.

Figure 20:
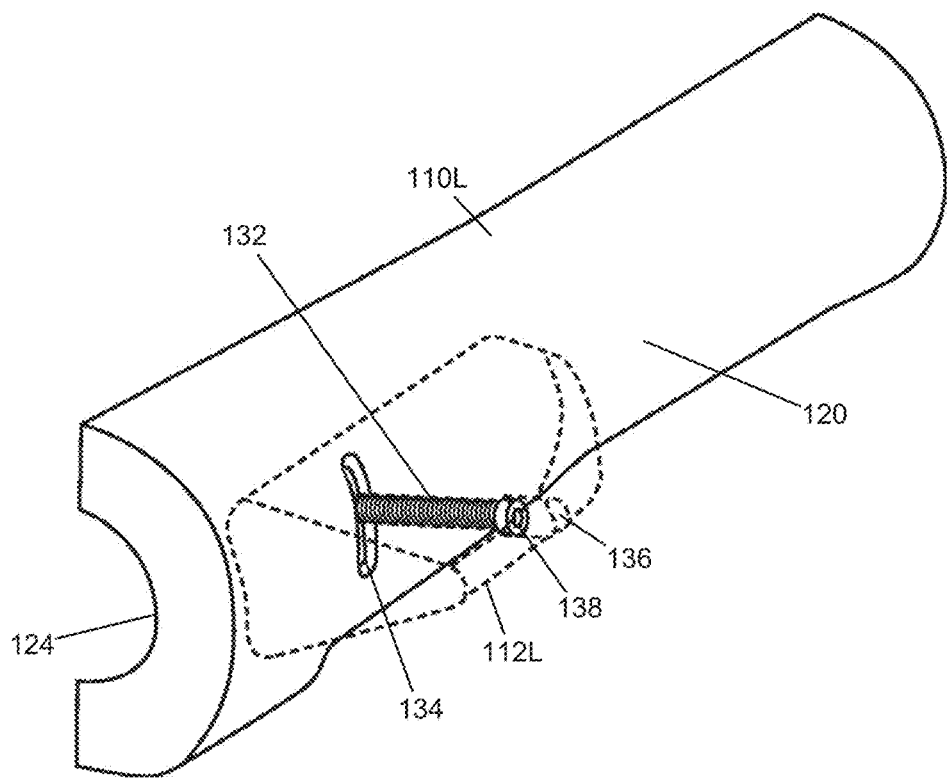
FIG. 20 is a perspective distal end view of a portion of the left grip housing of the left handlebar control of FIG. 10 showing a bolt that attaches a left palm rest (illustrated as transparent) to the left grip housing.
Figure 21:
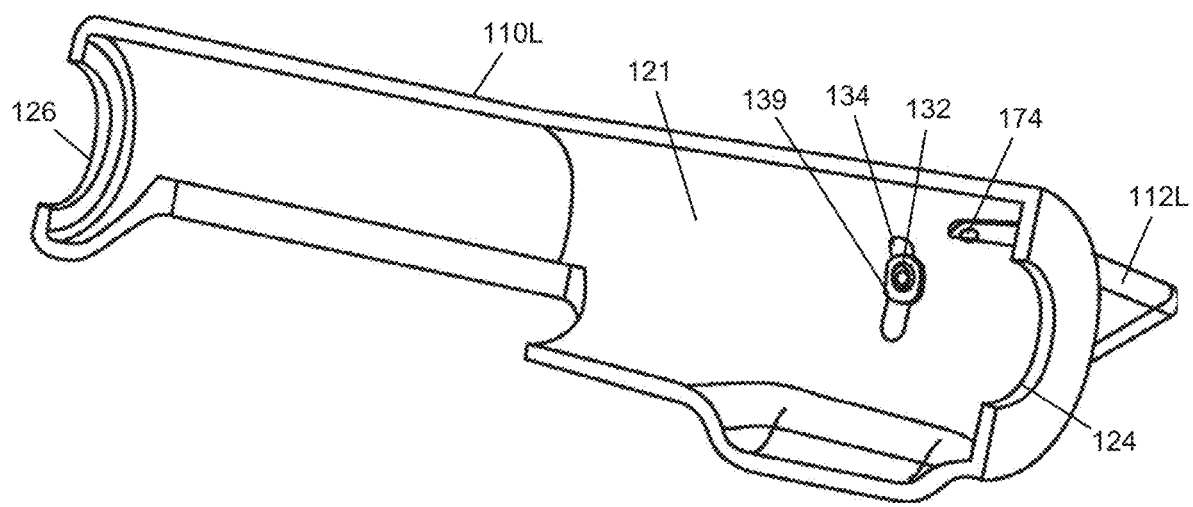
FIG. 21 is a perspective view of an interior of the left grip housing of the left handlebar control of FIG. 10 showing the bolt that attaches the left palm rest to the left grip housing.

Referring to FIG. 20, the left palm rest 112L may be attached to the left grip housing 110L by a bolt 132. The left grip housing 110L may include a slot 134 in which the bolt 132 is positioned. The bolt 132 is configured to slide within the slot 134 in the directions identified by the curved arrows "A4" and "A5" (see FIG. 13). The left palm rest 112L slides with the bolt 132 as a unit. The left palm rest 112L may include an access opening 136. As shown in FIG. 21, the bolt 132 may be threaded into a slidable member 139 positioned against the inside surface 121 of the left grip housing 110L. Referring to FIG. 20, the bolt 132 may have a head portion 138 configured to be engaged by a tool (not shown) that may be used to loosen or tighten the bolt 132 with respect to the slidable member 139 (see FIG. 21). Referring to FIG. 21, the slidable member 139 is configured not to pass through the slot 134 and to slide with the bolt 132 as a unit. Together, the slidable member 139, which is positioned along the inside surface 121, and the left palm rest 112L, which is positioned along the outer surface 120 (see FIGS. 12 and 20), clamp the left grip housing 110L when the bolt 132 is tightened. The slidable member 139 and the left palm rest 112L release the left grip housing 110L when the bolt 132 is loosened. Thus, when the bolt 132 has been loosed, the bolt 132 may slide within the slot 134, and the left palm rest 112L may be positioned in a desired position. After the left palm rest 112L is the desired position, the bolt 132 may be tightened to prevent the bolt 132 from sliding inside the slot 134.

Referring to FIG. 12, the left actuator assembly 116L is mounted on the left grip housing 110L and configured to be actuated by the user's fingers. Optionally, the left actuator assembly 116L may be configured to be adjustable with respect to the left grip housing 110L. For example, referring to FIG. 13, the left actuator assembly 116L may be rotatable with respect to the left grip housing 110L (see FIGS. 10, 12, 14-18, 20, and 21) in directions identified by curved arrows "A6" and "A7." Thus, referring to FIG. 12, the left palm rest 112L and/or the left actuator assembly 116L may be positioned (e.g., by the user) such that the user may rest the user's left palm on the left palm rest 112L and, at the same time, actuate (e.g., squeeze) the left actuator assembly 116L with the user's fingers.

Figure 16:
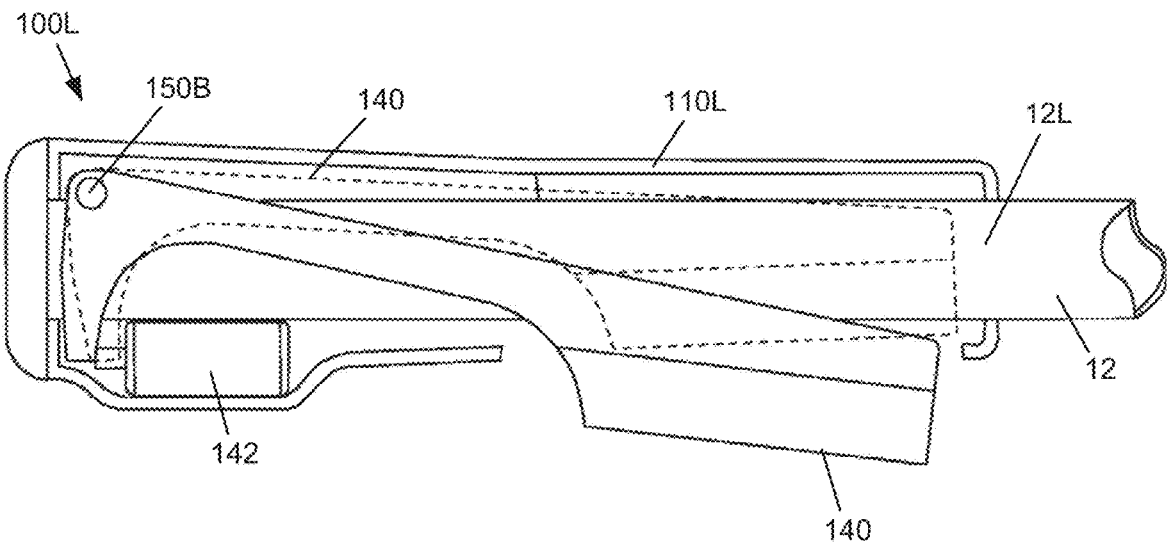
FIG. 16 is a cross-sectional bottom view of the left handlebar control of FIG. 10 omitting its lever housing and showing its actuator lever in both actuation and non-actuation positions.

Referring to FIG. 15, the left actuator assembly 116L includes a rotatable actuator lever 140, an actuator 142, and a lever housing 144. Referring to FIG. 16, the actuator lever 140 is rotatable with respect to the handlebar 12 between a non-actuation position shown in solid lines in FIG. 16 and an actuation position shown in dashed lines in FIG. 16. In the embodiment illustrated, the actuator lever 140 rotates about one or more pivot pins 150 (see FIG. 15) mounted inside the left grip housing 110L. Referring to FIG. 15, the actuator lever 140 has a distal portion 152 opposite a proximal portion 154. The pivot pin(s) 150 is/are coupled to the distal portion 152. The proximal portion 154 is configured to be pressed upon by the user. The proximal portion 154 is not attached to another structure and may be characterized as being a free end of the actuator lever 140. The actuator lever 140 has a cutout portion 160 with an edge 162 formed in the distal portion 152. The actuator 142 is at least partially positioned within the cutout portion 160 with the edge 162 being positioned to actuate the actuator 142 when the actuator lever 140 is in the actuation position (shown in dashed lines in FIG. 16).

Figure 17:
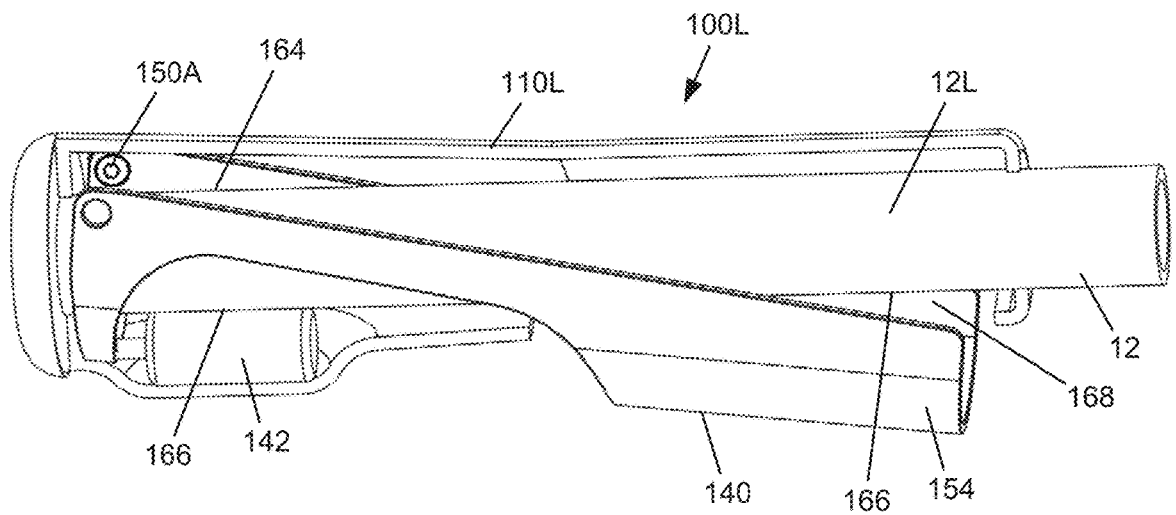
FIG. 17 is a perspective bottom view of the left handlebar control of FIG. 10 omitting its lever housing, a pivot pin, and a portion of its left grip housing.
Figure 18:
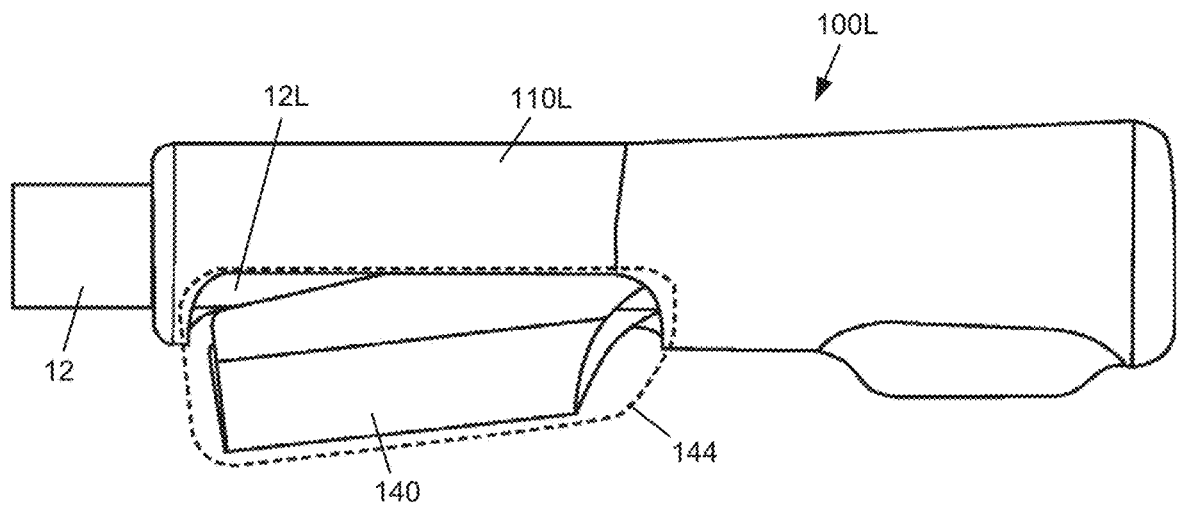
FIG. 18 is a bottom view of the left handlebar control of FIG. 10 with its lever housing illustrated as transparent.

Referring to FIG. 17, the left-hand side 12L of the handlebar 12 has a first outer surface portion 164 opposite a second outer surface portion 166 along the circumference of the handlebar 12. The pivot pin(s) 150 (see FIG. 15) is/are adjacent the first outer surface portion 164. The actuator lever 140 extends at an angle "A8" (see FIG. 15) from the pivot pin(s) 150 (see FIG. 15) to position an inside surface 168 of the proximal portion 154 alongside the second outer surface portion 166 of the handlebar 12. The inside surface 168 may be curved or otherwise configured to abut at least a portion of the second outer surface portion 166 of the handlebar 12 when the actuator lever 140 is in the actuation position (which is illustrated in dashed lines in FIG. 16). Referring to FIG. 15, the angle "A8" may be configured to allow the proximal portion 154 of the actuator lever 140 to travel about one inch when the actuator lever 140 is pivoted from the non-actuation position to the actuation position. Optionally, the angle "A8" may be adjustable.

Figure 19:
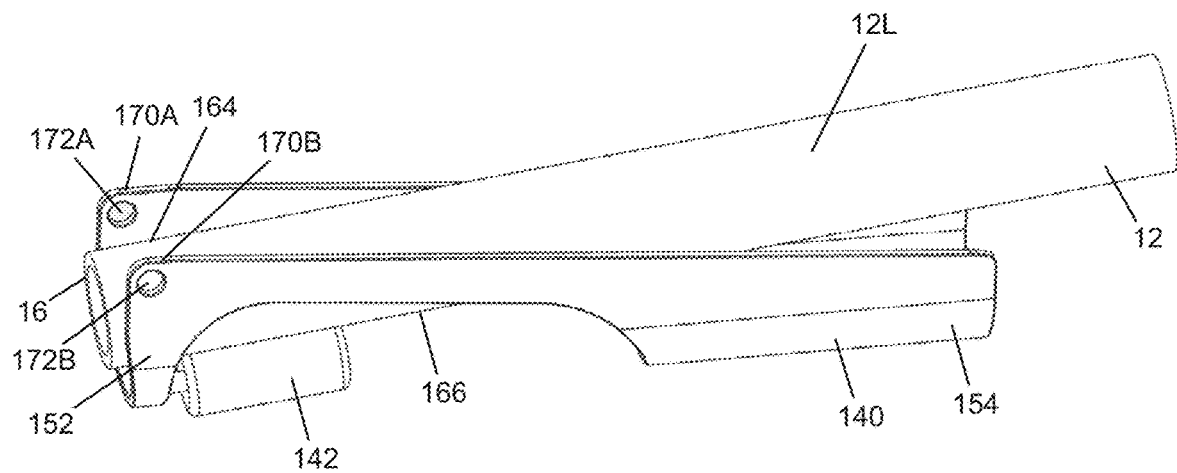
FIG. 19 is a perspective bottom view of the handlebar illustrated with the actuator lever and an actuator of the left handlebar control of FIG. 10.

Referring to FIG. 17, the proximal portion 154 of the actuator lever 140 may be generally U-shaped and configured to wrap partway around the handlebar 12. Thus, the proximal portion 154 extends from the second outer surface portion 166 upwardly toward the first outer surface portion 164 along both sides of the handlebar 12. Referring to FIG. 19, the distal portion 152 has a first portion 170A confronting a second portion 170б along opposite sides of the handlebar 12. The first and second portions 170A and 170B may include through-holes 172A and 172б, respectively, positioned near to the first outer surface portion 164 of the handlebar 12. The pivot pin(s) 150 (see FIG. 15) may be implemented as pivot pins 150A and 150B (see FIGS. 16 and 17) configured to be mounted in the through-holes 172A and 1726, respectively.

As mentioned above, the actuator lever 140 is rotatable with respect to the handlebar 12 about the pivot pins 150A and 150B (see FIGS. 16 and 17). Referring to FIG. 21, the left grip housing 110L may include an opening 174 for each of the pivot pins 150A and 150B (see FIGS. 16 and 17). Each of the openings 174 receives a different one of the pivot pins 150A and 1506 (see FIGS. 16 and 17).

Referring to FIG. 15, the actuator lever 140 transitions from the non-actuation position (which is illustrated in solid lines in FIG. 16) to the actuation position (which is illustrated in dashed lines in FIG. 16) when the user presses the proximal portion 154 of the actuator lever 140 toward the handlebar 12. This causes the actuator lever 140 to pivot about the pivot pin(s) 150 (see FIG. 15) and presses the edge 162 against the actuator 142. The actuator lever 140 transitions from the actuation position (which is illustrated in dashed lines in FIG. 16) to the non-actuation position (which is illustrated in solid lines in FIG. 16) when the user stops pressing the proximal portion 154 of the actuator lever 140 toward the handlebar 12. When this occurs, the actuator 142 presses or biases the edge 162 away from the actuator 142 to thereby return the actuator lever 140 to the non-actuation position (which is illustrated in solid lines in FIG. 16).

The actuator 142 has a switch 180 positioned to be pressed upon by the edge 162 when the actuator lever 140 is in the actuation position (which is illustrated in dashed lines in FIG. 16). The switch 180 turns on when pressed upon by the edge 162. The switch 180 is configured to press outwardly against the edge 162 and bias the actuator lever 140 toward the non-actuation position (which is illustrated in solid lines in FIG. 16). Thus, to turn on the switch 180, the user must press hard enough on the proximal portion 154 to provide sufficient force to overcome a biasing force applied to the actuator lever 140 by the switch 180. The switch 180 turns off when the user no longer applies the sufficient force to overcome the biasing force. In the embodiment illustrated, when the switch 180 is turned on, the actuator 142 activates the front and/or rear wheel brakes 102F and 102R (see FIG. 11) via the cable 118L (see FIGS. 10 and 11). On the other hand, when the switch 180 is turned off, the actuator 142 no longer activates the front and/or rear wheel brakes 102F and 102R (see FIG. 11) via the cable 118L (see FIGS. 10 and 11). However, in alternate embodiments, the actuator 142 may activate one or more components of the bicycle 8 other than the front and/or rear wheel brakes 102F and 102R (see FIG. 11) when the switch 180 is turned on and stops activating the other component(s) when the switch 180 is turned off. For example, the actuator 142 may activate a clutch (not shown) when the switch 180 is turned on and stops activating the clutch (not shown) when the switch 180 is turned off.

The actuator 142 may be implemented as a hydraulic cylinder (e.g., a hydraulic master cylinder), an electronic brake actuator, and the like. In embodiments in which the actuator 142 is implemented as an electronic brake actuator, the actuator 142 may also include a brake light switch 184 (see FIG. 11). Referring to FIG. 11, the brake light switch 184 may turn on a brake light 186 (e.g., positioned on a back portion of the bicycle 8) when the switch 180 is on and the brake light switch 184 may turn off the brake light 186 when the switch 180 is off. Thus, the brake light switch 184 is on (and turns on the brake light 186) when the actuator 142 is being actuated. On the other hand, the brake light switch 184 is off (and to turn off the brake light 186) when the actuator 142 is not being actuated. When the brake light 186 is on, it may alert others that the bicycle 8 is slowing and/or stopping. Thus, in some embodiments, the actuator 142 may activate one or more components of the bicycle 8 in addition to or instead of the front and/or rear wheel brakes 102F and 102R (see FIG. 11).

Referring to FIG. 15, the lever housing 144 covers the proximal portion 154 of the actuator lever 140. Thus, the lever housing 144 may be constructed from a flexible material that allows the actuator lever 140 to move between the non-actuation and actuation positions (illustrated in FIG. 16).

Referring to FIG. 11, optionally, one or both of the left and right handlebar controls 100L and 100R may include actuators 211-214. The actuators 211-214 may be implemented as buttons, switches, and the like. The actuators 211-214 are each configured to operate another component of the bicycle 8. Referring to FIG. 11, the actuator 211 may be implemented as a turn signal and/or flasher button. For example, the actuator 211 of the left handlebar control 100L may turn on the left turn signal light 114L when the actuator 211 is activated (e.g., pressed) by the user and the actuator 211 may turn off the left turn signal light 114L when the actuator 211 is deactivated (e.g., no longer pressed) by the user. The actuator 211 of the right handlebar control 100R may turn the right turn signal light 114R on and off in a similar manner. The actuators 213 and 214 may be implemented as gear shifting buttons. For example, the actuator 213 may be used to shift the bicycle's gears up and the actuator 214 may be used to shift the bicycle's gears down. The actuators 213 and 214 may be connected to the actuator 32 that is configured to operate the gear shifter 34. In such embodiments, the actuator 213 may instruct the actuator 32 to cause the gear shifter 34 to select a higher one of the plurality of gears and the actuator 214 may instruct the actuator 32 to cause the gear shifter 34 to select a lower one of the plurality of gears.

The left handlebar control 100L and/or the right handlebar control 100R may be configured to communicate wirelessly (e.g., using Bluetooth) with one or more external devices (e.g., a cellular telephone) and/or one or more components of the bicycle 8. For example, the left handlebar control 100L and/or the right handlebar control 100R may communicate wirelessly with the front brake 120F, the rear brake 120R, the actuator 32, and/or the brake light 186. In such embodiments, the cables 118L and 118R may be omitted. The actuator 212 may be implemented as a communication button. The communications button of the left handlebar control 100L may be used to pair the left handlebar control 100L with one or more other devices (e.g., using Bluetooth) and/or to enable communications with the other device(s) (e.g., using Bluetooth). Similarly, the communications button of the right handlebar control 100R may be used to pair the right handlebar control 100R with the other device(s) (e.g., using Bluetooth) and/or to enable communications with the other device(s) (e.g., using Bluetooth). By way of non-limiting examples, the other device(s) may include the front brake 120F, the rear brake 120R, the actuator 32, and/or the brake light 186. By way of more non-limiting examples, the other device(s) may include one or more external devices such as a cellular telephone, tablet computing device, and the like.

Figure 22:
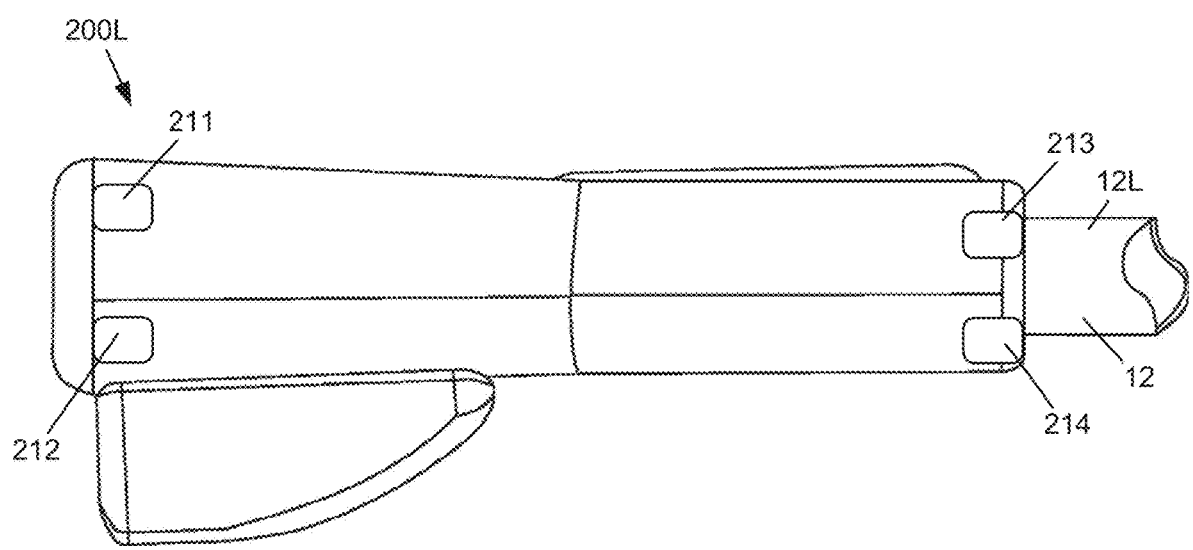
FIG. 22 is a top view of an alternate embodiment of the left handlebar control of FIG. 10.

FIG. 22 illustrates an alternate embodiment of a left handlebar control 200L. This embodiment includes the actuators 211-214, which in FIG. 22 have been illustrated as buttons positioned to be pressed upon by the user.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A handlebar control for use with a vehicle operated by a user, the vehicle comprising a handlebar operable to steer the vehicle and at least one brake configured to slow the vehicle when the at least one brake is activated, the handlebar control comprising:
a housing configured to be mounted on the handlebar, a housed portion of the handlebar being positioned inside the housing;
an actuator lever comprising a distal portion pivotably mounted about at least one pivot pin inside the housing, the distal portion disposed within an interior of the housing and wrapping partway around the housed portion of the handlebar, the actuator lever being pivotable between actuation and non-actuation positions with respect to the housing; and
a brake actuator configured to activate the at least one brake when actuated, the brake actuator not being actuated when the actuation lever is in the non-actuation position, the brake actuator being positioned to be actuated by the actuator lever when the actuation lever is pivoted manually by the user into the actuation position.

2. The handlebar control of claim 1, further comprising:
a palm rest mounted on the housing, the palm rest being configured to allow the user to rest a palm against the palm rest while the user operates the vehicle.

3. The handlebar control of claim 2, wherein the palm rest is rotatable with respect to the housing to position the palm rest such that the user may pivot the actuator lever while the user's palm is resting on the palm rest.

4. The handlebar control of claim 1 for use with the vehicle comprising a brake light, the handlebar control further comprising:
a brake light switch configured to turn on the brake light when the brake actuator is being actuated and to turn off the brake light when the brake actuator is not being actuated.

5. The handlebar control of claim 1, wherein the brake actuator comprises a switch,
the brake actuator is actuated when the switch is turned on,
the brake actuator is not actuated when the switch is turned off,
the actuator lever comprises a cutout portion with an inner edge,
the switch is at least partially positioned within the cutout portion,
the inner edge is positioned to turn on the switch when the actuation lever is pivoted by the user into the actuation position, and
the inner edge is not positioned to turn on the switch when the actuation lever is in the non-actuation position.

6. The handlebar control of claim 5, wherein the switch applies a biasing force to the actuator lever that biases the actuator lever toward the non-actuation position, and
the user applies a force to the actuator lever sufficient to overcome the biasing force when the user pivots the actuation lever into the actuation position.

7. The handlebar control of claim 1, wherein the housed portion of the handlebar has a circumference,
the actuator lever comprises a proximal portion opposite the distal portion,
the distal portion is pivotably mounted to the housing along a first outer surface portion of the housed portion of the handlebar,
the proximal portion is configured to be pressed upon by the user to pivot the actuator lever from the non-actuation position to the actuation position,
the proximal portion is alongside a second outer surface portion of the housed portion when the actuator lever is in the actuation position, and
the first outer surface portion is opposite the second outer surface portion along the circumference of the housed portion of the handlebar.

8. The handlebar control of claim 7, wherein the proximal portion has a curved inside surface configured to abut and wrap partway around at least a portion of the second outer surface portion of the housed portion of the handlebar when the actuator lever is in the actuation position.

9. The handlebar control of claim 7, wherein the distal portion has a first distal portion and a second distal portion,
the first distal portion confronts the second distal portion along opposite sides of the housed portion of the handlebar,
the at least one pivot pin includes a first pivot pin and a second pivot pin,
the first distal portion is pivotably mounted to the housing by the first pivot pin,
the second distal portion is pivotably mounted to the housing by a second pivot pin, and
the first pivot pin is different from the second pivot pin.

10. The handlebar control of claim 1, further comprising:
a flexible lever housing attached to the housing, the actuator lever comprising a proximal portion opposite the distal portion, the distal portion being pivotably mounted to the housing, the proximal portion being positioned inside the lever housing, the lever housing being configured to allow the user to press upon the proximal portion through the lever housing when the user pivots the actuator lever from the non-actuation position to the actuation position.

11. The handlebar control of claim 1, further comprising:
a turn signal mounted on the housing; and
a turn signal actuator mounted on the housing and positioned to be manually actuated by the user, the turn signal actuator turning on the turn signal when actuated by the user.

12. The handlebar control of claim 1 for use with the vehicle comprising a plurality of gears, a gear shifter, and a shift actuator, the gear shifter being configured to select one of the plurality of gears, the shift actuator being configured to operate the gear shifter and cause the gear shifter to select a different one of the plurality of gears, the handlebar control further comprising:
a first actuator configured to instruct the shift actuator to cause the gear shifter to select a higher one of the plurality of gears; and
a second actuator configured to instruct the shift actuator to cause the gear shifter to select a lower one of the plurality of gears.

13. A handlebar control for use with a vehicle operated by a user, the vehicle comprising a handlebar operable to steer the vehicle and at least one brake configured to slow the vehicle when the at least one brake is activated, the handlebar control comprising:
an actuator assembly mounted on the handlebar and configured to be actuated manually by a hand of the user, the actuator assembly being configured to activate the at least one brake when actuated the actuator assembly including a housing and an actuator lever, the actuator lever comprising a distal portion pivotably mounted to the housing and wrapping partway around the handlebar; and
a palm rest mounted on the handlebar and configured to allow the user to rest a palm of the hand against the palm rest while the user operates the vehicle, the palm rest being rotatable with respect to the handlebar to change a circumferential distance around the handlebar between the palm rest and the actuator assembly.

14. The handlebar control of claim 13, wherein:
the housing is configured to be mounted on the handlebar, a housed portion of the handlebar is positioned inside the housing,
the palm rest is mounted on the housing,
the actuator lever is pivotable between actuation and non-actuation positions with respect to the housing, and
the actuator assembly further comprises a brake actuator configured to activate the at least one brake when actuated, the brake actuator not being actuated when the actuation lever is in the non-actuation position, the brake actuator being positioned to be actuated by the actuator lever when the actuation lever is pivoted manually by the user into the actuation position.

15. A bicycle comprising:
at least one brake configured to slow the bicycle when the at least one brake is activated;
a handlebar operable by a user to steer the vehicle; and
a handlebar control comprising:
(a) a housing configured to be mounted on the handlebar, a housed portion of the handlebar being positioned inside the housing;
(b) an actuator lever comprising a distal portion pivotably mounted about at least one pivot pin inside the housing, the distal portion disposed within an interior of the housing and wrapping partway around the housed portion of the handlebar, the actuator lever being pivotable between actuation and non-actuation positions with respect to the housing; and
(c) a brake actuator configured to activate the at least one brake when actuated, the brake actuator not being actuated when the actuation lever is in the non-actuation position, the brake actuator being positioned to be actuated by the actuator lever when the actuation lever is pivoted manually by the user into the actuation position.

16. The bicycle of claim 15, wherein the handlebar has a left free end and a right free end,
the handlebar control is a right handlebar control mounted on the right free end of the handlebar, and
the bicycle comprises a left handlebar control mounted on the left free end of the handlebar, the left handlebar control being a mirror image of the right handlebar control.

17. The bicycle of claim 15, wherein the handlebar control comprises:
a palm rest mounted on the housing, the palm rest being configured to allow the user to rest a palm against the palm rest while the user operates the bicycle.

18. The bicycle of claim 17, wherein the palm rest is rotatable with respect to the housing to position the palm rest such the user may pivot the actuator lever while the user's palm is resting on the palm rest.

19. The bicycle of claim 15, further comprising:
a brake light, the handlebar control further comprising a brake light switch configured to turn on the brake light when the brake actuator is being actuated and to turn off the brake light when the brake actuator is not being actuated.

20. The bicycle of claim 15, wherein the brake actuator comprises a switch that when turned on actuates the brake actuator,
the actuator lever comprises a cutout portion with an inner edge,
the switch is at least partially positioned within the cutout portion, and
the inner edge is positioned to turn on the switch when the actuation lever is pivoted by the user into the actuation position.

21. The bicycle of claim 20, wherein the switch applies a biasing force to the actuator lever that biases the actuator lever toward the non-actuation position, and the user applies a force to the actuator lever sufficient to overcome the biasing force when the user pivots the actuation lever into the actuation position.

22. The bicycle of claim 15, wherein a free end portion of the handlebar has a circumference, the housing is configured to be mounted on the free end portion, the actuator lever comprises a proximal portion opposite the distal portion, the distal portion is pivotably mounted to the housing along a first outer surface portion of the free end portion of the handlebar, the proximal portion is configured to be pressed upon by the user to pivot the actuator lever from the non-actuation position to the actuation position, the proximal portion is alongside a second outer surface portion of the free end portion when the actuator lever is in the actuation position, and the first outer surface portion is opposite the second outer surface portion along the circumference of the free end portion of the handlebar.

23. The bicycle of claim 15, further comprising:

a turn signal, the handlebar control further comprising a turn signal actuator mounted on the housing and positioned to be manually actuated by the user, the turn signal actuator turning on the turn signal when actuated by the user.

24. The bicycle of claim 15, further comprising:

a plurality of gears;

a gear shifter configured to select one of the plurality of gears; and a shift actuator configured to operate the gear shifter and cause the gear shifter to select a different one of the plurality of gears, the handlebar control further comprising a first actuator configured to instruct the shift actuator to cause the gear shifter to select a higher one of the plurality of gears, and a second actuator configured to instruct the shift actuator to cause the gear shifter to select a lower one of the plurality of gears.

* * * * *